(12) United States Patent
Seitz et al.

(10) Patent No.: US 12,037,005 B2
(45) Date of Patent: Jul. 16, 2024

(54) METHOD FOR OPERATING A DRIVER INFORMATION SYSTEM IN AN EGO-VEHICLE AND DRIVER INFORMATION SYSTEM

(71) Applicant: Volkswagen Aktiengesellschaft, Wolfsburg (DE)

(72) Inventors: Gordon Seitz, Ehra-Lessien (DE); Johanna Sandbrink, Braunschweig (DE); Marie Puhle, Gifhorn (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 362 days.

(21) Appl. No.: 17/433,653

(22) PCT Filed: Feb. 19, 2020

(86) PCT No.: PCT/EP2020/054298
§ 371 (c)(1),
(2) Date: Aug. 25, 2021

(87) PCT Pub. No.: WO2020/173768
PCT Pub. Date: Sep. 3, 2020

(65) Prior Publication Data
US 2022/0135061 A1  May 5, 2022

(30) Foreign Application Priority Data
Feb. 26, 2019 (DE) ...................... 10 2019 202 578.1

(51) Int. Cl.
*B60W 50/14* (2020.01)
*B60W 30/18* (2012.01)

(52) U.S. Cl.
CPC ....... *B60W 50/14* (2013.01); *B60K 2360/171* (2024.01); *B60W 30/18163* (2013.01); *B60W 2050/146* (2013.01); *B60W 2300/14* (2013.01)

(58) Field of Classification Search
CPC ....... B60W 2050/146; B60W 2300/14; B60W 30/18163; B60W 50/14; B60W 2300/146;
(Continued)

(56) References Cited

U.S. PATENT DOCUMENTS

| 5,661,650 A | 8/1997 | Sekine et al. ................... 701/82 |
| 6,185,489 B1 | 2/2001 | Strickler ...................... 701/31.9 |

(Continued)

FOREIGN PATENT DOCUMENTS

| CN | 105711593 A | 6/2016 | ............. B60K 35/00 |
| CN | 109285372 A | 1/2019 | ........... G08G 1/0962 |

(Continued)

OTHER PUBLICATIONS

Tönnis, Marcus, "Towards Automated Augmented Reality," Dissertation, URL: https://mediatum.ub.tum.de/doc/652549/file.pdf, 305 pages, 2008.

(Continued)

*Primary Examiner* — Khoi H Tran
*Assistant Examiner* — Tanner L Cullen
(74) *Attorney, Agent, or Firm* — Slayden Grubert Beard PLLC

(57) ABSTRACT

A method for operating a driver information system in an ego-vehicle is provided, wherein an operating state of a trailer device of the ego-vehicle is recorded. A driver information display is generated and output, wherein the driver information display comprises an ego-object which represents the ego-vehicle. In addition, the ego-object is represented from behind in a perspective view and the driver information display also comprises a lane object which (Continued)

represents a road section lying in front of the ego-vehicle in the direction of travel. The driver information display also comprises a trailer object which is formed according to a recorded operating state of the trailer device and which represents an attached device.

20 Claims, 13 Drawing Sheets

(58) Field of Classification Search
CPC ......... B60W 2530/203; B60R 2300/60; B60R 2300/802; B60K 2370/171; B60K 2370/152; B60K 2370/52; B60K 2370/178; B60K 2370/172; B60K 2370/177; B60K 2360/171; B60K 35/23
See application file for complete search history.

(56) References Cited

U.S. PATENT DOCUMENTS

| | | | |
|---|---|---|---|
| 6,747,680 B1 | 6/2004 | Igarashi et al. | 715/784 |
| 7,151,439 B2 | 12/2006 | Moisel et al. | 340/425.5 |
| 7,876,203 B2 | 1/2011 | Traylor et al. | 340/435 |
| 7,924,146 B2 | 4/2011 | Seder et al. | 340/435 |
| 8,354,944 B2 | 1/2013 | Riegel et al. | 340/995.19 |
| 8,521,411 B2 | 8/2013 | Grabowski et al. | 701/532 |
| 8,676,431 B1 | 3/2014 | Mariet et al. | 701/28 |
| 8,686,872 B2 | 4/2014 | Szczerba et al. | 340/905 |
| 9,140,553 B2 | 9/2015 | Grimm et al. | |
| 9,470,777 B2 | 10/2016 | Arage et al. | |
| 9,530,259 B2 | 12/2016 | Hauschild et al. | |
| 10,067,341 B1 | 9/2018 | Breed et al. | |
| 10,166,998 B2 | 1/2019 | Kamiya et al. | |
| 10,853,665 B2 | 12/2020 | Kang | |
| 10,890,919 B2 | 1/2021 | Smith et al. | |
| 10,953,711 B2 | 3/2021 | Ling et al. | |
| 11,248,925 B2 | 2/2022 | Lee et al. | |
| 2005/0086000 A1 | 4/2005 | Tsuchiya et al. | 701/538 |
| 2005/0149251 A1 | 7/2005 | Donath et al. | 701/532 |
| 2005/0190952 A1 | 9/2005 | Nagasawa et al. | 382/103 |
| 2005/0273218 A1 | 12/2005 | Breed et al. | 701/2 |
| 2007/0050127 A1 | 3/2007 | Kellum et al. | 701/439 |
| 2008/0055192 A1 | 3/2008 | Nagano et al. | 345/7 |
| 2010/0114477 A1 | 5/2010 | Yeh | 701/533 |
| 2010/0289632 A1 | 11/2010 | Seder et al. | 340/436 |
| 2011/0199198 A1 | 8/2011 | Yang et al. | 340/426.25 |
| 2011/0293145 A1 | 12/2011 | Nogami et al. | 382/103 |
| 2011/0301813 A1 | 12/2011 | Sun et al. | 701/41 |
| 2012/0022716 A1 | 1/2012 | Kitahama et al. | 701/1 |
| 2012/0059720 A1 | 3/2012 | Musabji et al. | 705/14.58 |
| 2012/0169513 A1 | 7/2012 | Szczerba et al. | 340/905 |
| 2012/0271484 A1 | 10/2012 | Feit et al. | 701/1 |
| 2012/0271539 A1 | 10/2012 | Bald et al. | 701/300 |
| 2013/0038472 A1* | 2/2013 | Gackstatter | B60W 30/0953 340/902 |
| 2013/0057688 A1 | 3/2013 | Furukawa | 348/148 |
| 2013/0304322 A1 | 11/2013 | Isaji et al. | 701/41 |
| 2013/0345895 A1 | 12/2013 | Reynolds | 701/1 |
| 2014/0019005 A1 | 1/2014 | Lee et al. | 701/36 |
| 2014/0236483 A1 | 8/2014 | Beaurepaire et al. | 701/533 |
| 2014/0253310 A1 | 9/2014 | Tippelhofer et al. | 340/439 |
| 2014/0257686 A1 | 9/2014 | Feldman et al. | 701/300 |
| 2014/0258928 A1 | 9/2014 | Brush et al. | 715/810 |
| 2014/0285523 A1 | 9/2014 | Gruenler et al. | 345/633 |
| 2014/0358429 A1 | 12/2014 | Shutko et al. | 701/458 |
| 2014/0362347 A1 | 12/2014 | Oel | 353/13 |
| 2015/0204687 A1 | 7/2015 | Yoon et al. | 701/436 |
| 2015/0332654 A1 | 11/2015 | Geloen | 345/697 |
| 2016/0101730 A1 | 4/2016 | Shehan et al. | 340/431 |
| 2016/0153801 A1 | 6/2016 | Cho et al. | 701/431 |
| 2016/0176413 A1 | 6/2016 | Oguri | 701/22 |
| 2016/0264045 A1 | 9/2016 | Ng-thow-hing et al. | 340/905 |
| 2017/0039765 A1 | 2/2017 | Zhou et al. | 345/633 |
| 2017/0039856 A1 | 2/2017 | Park | 701/23 |
| 2017/0076598 A1 | 3/2017 | Scofield et al. | 340/905 |
| 2017/0106750 A1 | 4/2017 | Tauchi et al. | 348/115 |
| 2017/0136878 A1 | 5/2017 | Frank et al. | 345/619 |
| 2017/0154554 A1 | 6/2017 | Tanaka et al. | 345/7 |
| 2017/0235135 A1 | 8/2017 | Ishiguro et al. | |
| 2017/0253182 A1 | 9/2017 | Aoki et al. | |
| 2017/0276935 A1 | 9/2017 | Sisbot | |
| 2017/0285647 A1 | 10/2017 | Saito et al. | |
| 2017/0330463 A1 | 11/2017 | Li et al. | |
| 2017/0349213 A1 | 12/2017 | Abdel-Rahman et al. | |
| 2018/0001766 A1 | 1/2018 | Mcnew et al. | |
| 2018/0004204 A1 | 1/2018 | Rider et al. | |
| 2018/0031384 A1 | 2/2018 | Lee et al. | |
| 2018/0058873 A1 | 3/2018 | Huang et al. | |
| 2018/0058879 A1* | 3/2018 | Tayama | B60W 30/16 |
| 2018/0074497 A1 | 3/2018 | Tsuji et al. | |
| 2018/0090007 A1 | 3/2018 | Takemori et al. | |
| 2018/0099665 A1 | 4/2018 | You | |
| 2018/0128916 A1 | 5/2018 | Bialer | |
| 2018/0129854 A1 | 5/2018 | Jeon | |
| 2018/0134217 A1 | 5/2018 | Peterson et al. | |
| 2018/0141496 A1* | 5/2018 | Loehr | G06V 20/20 |
| 2018/0148072 A1 | 5/2018 | Kamiya et al. | |
| 2018/0247138 A1 | 8/2018 | Kang | |
| 2018/0286094 A1 | 10/2018 | Shishido et al. | |
| 2018/0286095 A1 | 10/2018 | Kusayanagi et al. | |
| 2018/0312110 A1 | 11/2018 | Takae et al. | |
| 2018/0348000 A1 | 12/2018 | Cai et al. | |
| 2018/0370567 A1 | 12/2018 | Rowell | |
| 2019/0049724 A1 | 2/2019 | Kimura et al. | |
| 2019/0100245 A1* | 4/2019 | Fukushima | B62D 13/06 |
| 2019/0138002 A1 | 5/2019 | Mimura et al. | |
| 2019/0161010 A1 | 5/2019 | Repale et al. | |
| 2019/0164333 A1* | 5/2019 | Fukushima | H04N 7/181 |
| 2019/0193632 A1 | 6/2019 | Lewis | |
| 2019/0226866 A1 | 7/2019 | Chang | |
| 2019/0235241 A1 | 8/2019 | Suzuki et al. | |
| 2019/0258265 A1 | 8/2019 | Wiacker | |
| 2019/0359228 A1 | 11/2019 | Banno et al. | |
| 2020/0042807 A1 | 2/2020 | Schutzmeier et al. | |
| 2020/0058139 A1 | 2/2020 | Turner | |
| 2020/0089223 A1* | 3/2020 | Feng | B60W 40/068 |
| 2020/0089232 A1 | 3/2020 | Gdalyahu et al. | |
| 2020/0172122 A1 | 6/2020 | Mimura et al. | |
| 2020/0180619 A1 | 6/2020 | Lee | |
| 2020/0249674 A1 | 8/2020 | Dally et al. | |
| 2021/0094577 A1 | 4/2021 | Shalev-shwartz et al. | |
| 2021/0110484 A1 | 4/2021 | Shalev-shwartz et al. | |
| 2021/0148724 A1 | 5/2021 | Bang et al. | |
| 2021/0192237 A1* | 6/2021 | Guenzel | G06V 20/58 |
| 2021/0323550 A1 | 10/2021 | Choi | |
| 2022/0316897 A1 | 10/2022 | Eggert et al. | |

FOREIGN PATENT DOCUMENTS

| | | | | |
|---|---|---|---|---|
| DE | 2241427 A1 | 3/1974 | | B60Q 1/44 |
| DE | 19506364 A1 | 8/1995 | | B62D 1/28 |
| DE | 10327869 A1 | 1/2005 | | G01C 21/34 |
| DE | 102005046430 A1 | 3/2007 | | B60K 31/00 |
| DE | 102005046672 A1 | 4/2007 | | B60K 35/00 |
| DE | 102005055744 A1 | 5/2007 | | B60W 50/08 |
| DE | 602004011164 T2 | 12/2008 | | G08G 1/16 |
| DE | 102008028374 A1 | 12/2009 | | G01C 21/36 |
| DE | 102009010121 A1 | 12/2009 | | B60K 35/00 |
| DE | 102009031087 A1 | 3/2010 | | B60K 35/00 |
| DE | 102009027026 A1 | 12/2010 | | B60K 35/00 |
| DE | 112006002262 A1 | 12/2011 | | G01C 21/26 |
| DE | 102011100907 A1 | 1/2012 | | G01S 13/89 |
| DE | 102010049721 A1 | 4/2012 | | B60W 30/08 |
| DE | 102011121847 A1 | 7/2012 | | B60R 1/10 |
| DE | 112010001354 T5 | 8/2012 | | G01C 21/00 |
| DE | 102011112943 A1 | 3/2013 | | B60K 35/00 |
| DE | 102011116124 A1 | 4/2013 | | B60K 35/00 |
| DE | 102012022486 A1 | 8/2013 | | B60W 50/14 |
| DE | 102012208188 A1 | 11/2013 | | B60W 30/16 |
| DE | 102013010818 A1 | 12/2013 | | G01C 21/36 |
| DE | 102012214873 A1 | 3/2014 | | G08G 1/09 |
| DE | 102012214959 A1 | 3/2014 | | B60W 30/06 |
| DE | 102012219721 A1 | 4/2014 | | B60W 30/12 |

(56) References Cited

FOREIGN PATENT DOCUMENTS

| | | | | |
|---|---|---|---|---|
| DE | 102012220100 A1 | 5/2014 | ............ | B60K 35/00 |
| DE | 102013016242 A1 | 4/2015 | ............ | B60K 31/00 |
| DE | 102013225459 A1 | 6/2015 | ............ | B60K 35/00 |
| DE | 102014208973 A1 | 11/2015 | ............ | B60R 16/02 |
| DE | 102014009985 A1 | 1/2016 | ............ | B60K 35/00 |
| DE | 102015114565 A1 | 3/2016 | ............ | B60R 16/02 |
| DE | 102015205074 A1 | 3/2016 | ............ | B60W 50/14 |
| DE | 102015114614 A1 | 4/2016 | ............ | B60W 30/08 |
| DE | 102015212664 A1 | 1/2017 | ............ | B60R 160/02 |
| DE | 102015117903 A1 | 4/2017 | ............ | B60W 40/12 |
| DE | 102015225346 A1 | 6/2017 | ............ | B60W 50/14 |
| DE | 102005046756 B4 | 10/2017 | ............ | B60K 35/00 |
| DE | 112016001259 T5 | 11/2017 | ............ | B60K 35/00 |
| DE | 102016208372 A1 | 12/2017 | ............ | B60W 30/06 |
| DE | 102017112118 A1 | 12/2017 | ............ | B62D 6/00 |
| DE | 102016212688 A1 | 1/2018 | ............ | G08G 1/0965 |
| DE | 102016115313 A1 | 2/2018 | ............ | B60R 1/00 |
| DE | 102017217961 A1 | 4/2018 | ............ | G08G 1/16 |
| DE | 102016122301 A1 | 5/2018 | ............ | B60R 1/00 |
| DE | 102016223389 A1 | 5/2018 | ............ | B60R 1/00 |
| DE | 102017003399 A1 | 10/2018 | ............ | B60W 30/08 |
| DE | 102017107484 A1 | 10/2018 | ............ | B60W 30/08 |
| DE | 102017208124 A1 | 11/2018 | ............ | G06K 9/62 |
| DE | 102017212367 A1 | 1/2019 | ............ | B60R 16/02 |
| DE | 102019202576 A1 | 8/2020 | ............ | B60W 50/14 |
| DE | 102019202578 A1 | 8/2020 | ............ | B60W 50/14 |
| DE | 102019202580 A1 | 8/2020 | ............ | B60W 50/14 |
| DE | 102019202581 A1 | 8/2020 | ............ | B60W 40/072 |
| DE | 102019202585 A1 | 8/2020 | ............ | B60W 50/14 |
| DE | 102019202586 A1 | 8/2020 | ............ | B60W 50/14 |
| DE | 102019202587 A1 | 8/2020 | ............ | B60W 50/14 |
| DE | 102019202588 A1 | 8/2020 | ............ | B60W 50/14 |
| DE | 102019202591 A1 | 8/2020 | ............ | B60W 40/02 |
| DE | 102019202592 A1 | 8/2020 | ............ | B60W 50/14 |
| EP | 3040830 A1 | 7/2016 | ............ | B60K 35/00 |
| EP | 3269579 A1 * | 1/2018 | ............ | B60K 35/00 |
| EP | 3269579 A1 | 1/2018 | ............ | B60K 37/06 |
| EP | 3275716 A1 | 1/2018 | ............ | B60K 35/00 |
| EP | 3321913 A1 | 5/2018 | ............ | B60K 35/00 |
| EP | 3367366 A1 | 8/2018 | ............ | B60R 21/00 |
| EP | 3376366 A1 | 9/2018 | ............ | G06F 3/14 |
| EP | 3418161 A1 | 12/2018 | ............ | B62D 15/02 |
| FR | 3056804 A1 | 3/2018 | ............ | B60W 30/00 |
| GB | 1441606 A | 7/1976 | ............ | B60Q 1/44 |
| GB | 2550472 A | 11/2017 | ............ | B60R 1/00 |
| JP | 2006031328 A | 2/2006 | ............ | G08G 1/09 |
| JP | 2013237290 A | 11/2013 | ............ | B60K 35/00 |
| JP | 2015182624 A | 10/2015 | | |
| JP | 2016182891 A | 10/2016 | ............ | B60K 35/00 |
| JP | 2018203014 A | 12/2018 | ............ | B60R 11/02 |
| WO | 2015/068269 A1 | 5/2015 | ............ | B60K 35/00 |
| WO | 2016/088312 A1 | 6/2016 | ............ | B60K 35/00 |
| WO | 2018/008061 A1 | 1/2018 | | |
| WO | 2017/046937 A1 | 8/2018 | ............ | B60K 35/00 |
| WO | 2018/147066 A1 | 8/2018 | ............ | B60K 35/00 |
| WO | 2017/187622 A1 | 11/2018 | ............ | B60W 30/10 |
| WO | 2020/048564 A1 | 3/2020 | ............ | B60K 35/00 |
| WO | 2020/173767 A1 | 9/2020 | ............ | B60K 35/00 |
| WO | 2020/173768 A1 | 9/2020 | ............ | B60K 35/00 |
| WO | 2020/173769 A1 | 9/2020 | ............ | B60K 37/06 |
| WO | 2020/173770 A1 | 9/2020 | ............ | B60K 35/00 |
| WO | 2020/173772 A1 | 9/2020 | ............ | B60K 35/00 |
| WO | 2020/173773 A1 | 9/2020 | ............ | B60K 35/00 |
| WO | 2020/173774 A1 | 9/2020 | ............ | B60K 35/00 |
| WO | 2020/173775 A1 | 9/2020 | ............ | B60K 37/06 |
| WO | 2020/173778 A1 | 9/2020 | ............ | B60K 35/00 |
| WO | 2020/173779 A1 | 9/2020 | ............ | B60K 35/00 |

OTHER PUBLICATIONS

German Office Action, Application No. 102019202591.9, 6 pages, Nov. 26, 2019.
German Office Action, Application No. 102019202592.7, 7 pages, Dec. 3, 2019.
German Office Action, Application No. 102019202586.2, 7 pages, Dec. 6, 2019.
German Office Action, Application No. 102019202588.9, 7 pages, Dec. 10, 2019.
German Office Action, Application No. 102019202581.1, 6 pages, Dec. 19, 2019.
German Office Action, Application No. 102019202587.0, 7 pages, Jan. 8, 2020.
German Office Action, Application No. 102019202585.4, 7 pages, Jan. 14, 2020.
German Office Action, Application No. 102019202576.5, 7 pages, Jan. 20, 2020.
German Office Action, Application No. 102019202580.3, 6 pages, Jan. 29, 2020.
German Office Action, Application No. 102019202578.1, 7 pages, Jan. 29, 2020.
International Search Report and Written Opinion, Application No. PCT/EP2020/054297, 20 pages, Apr. 8, 2020.
International Search Report and Written Opinion, Application No. PCT/EP2020/054307, 20 pages, Apr. 28, 2020.
International Search Report and Written Opinion, Application No. PCT/EP2020/054303, 28 pages, May 7, 2020.
International Search Report and Written Opinion, Application No. PCT/EP2020/054299, 18 pages, May 7, 2020.
International Search Report and Written Opinion, Application No. PCT/EP2020/054315, 17 pages, May 8, 2020.
International Search Report and Written Opinion, Application No. PCT/EP2020/054300, 18 pages, May 12, 2020.
International Search Report and Written Opinion, Application No. PCT/EP2020/054319, 21 pages, May 13, 2020.
International Search Report and Written Opinion, Application No. PCT/EP2020/054298, 18 pages, May 15, 2020.
International Search Report and Written Opinion, Application No. PCT/EP2020/054305, 17 pages, May 15, 2020.
International Search Report and Written Opinion, Application No. PCT/EP2020/054321, 20 pages, May 28, 2020.
European Office Action, Application No. 20706227.4, 5 pages, Dec. 16, 2022.
U.S. Non-Final Office Action, U.S. Appl. No. 17/433,902, 27 pages, Jul. 6, 2022.
U.S. Final Office Action, U.S. Appl. No. 17/433,902, 16 pages, Sep. 14, 2022.
U.S. Final Office Action, U.S. Appl. No. 17/433,902, 17 pages, Mar. 22, 2023.
U.S. Non-Final Office Action, U.S. Appl. No. 17/434,149, 24 pages, May 25, 2023.
U.S. Notice of Allowance, U.S. Appl. No. 17/434,149, 10 pages, Sep. 14, 2023.
U.S. Non-Final Office Action, U.S. Appl. No. 17/433,739, 22 pages, Oct. 13, 2023.
U.S. Non-Final Office Action, U.S. Appl. No. 17/433,823, 42 pages, Oct. 26, 2023.
U.S. Non-Final Office Action, Application No. 17,433,872, 21 pages, Nov. 27, 2023.
U.S. Non-Final Office Action, U.S. Appl. No. 17/433,928, 30 pages, Dec. 6, 2023.
Chinese Office Action, Application No. 202080031470.8, 23 pages, Feb. 23, 2024.
Chinese Office Action, Application No. 202080016711.1, 19 pages, Feb. 23, 2024.
Chinese Office Action, Application No. 202080030555.4, 19 pages, Feb. 23, 2024.
Chinese Office Action, Application No. 202080017007.8, 26 pages, Feb. 27, 2024.
Chinese Office Action, Application No. 202080017008.2, 23 pages, Feb. 27, 2024.
German Office Action, Application No. 102019202591.9, 8 pages, Mar. 21, 2024.
U.S. Non-Final Office Action, U.S. Appl. No. 17/433,709, 30 pages, Apr. 8, 2024.
U.S. Notice of Allowance, U.S. Appl. No. 17/433,872, 10 pages, Feb. 21, 2024.

(56) References Cited

OTHER PUBLICATIONS

U.S. Final Office Action, U.S. Appl. No. 17/433,928, 28 pages, Mar. 5, 2024.
U.S. Notice of Allowance, U.S. Appl. No. 17/434,214, 23 pages, Feb. 7, 2024.
U.S. Notice of Allowance, U.S. Appl. No. 17/433,823, 16 pages, Feb. 7, 2024.
Chinese Office Action, Application No. 202080030171.2, 15 pages.
U.S. Non-Final Office Action, U.S. Appl. No. 17/433,928, 25 pages.

* cited by examiner

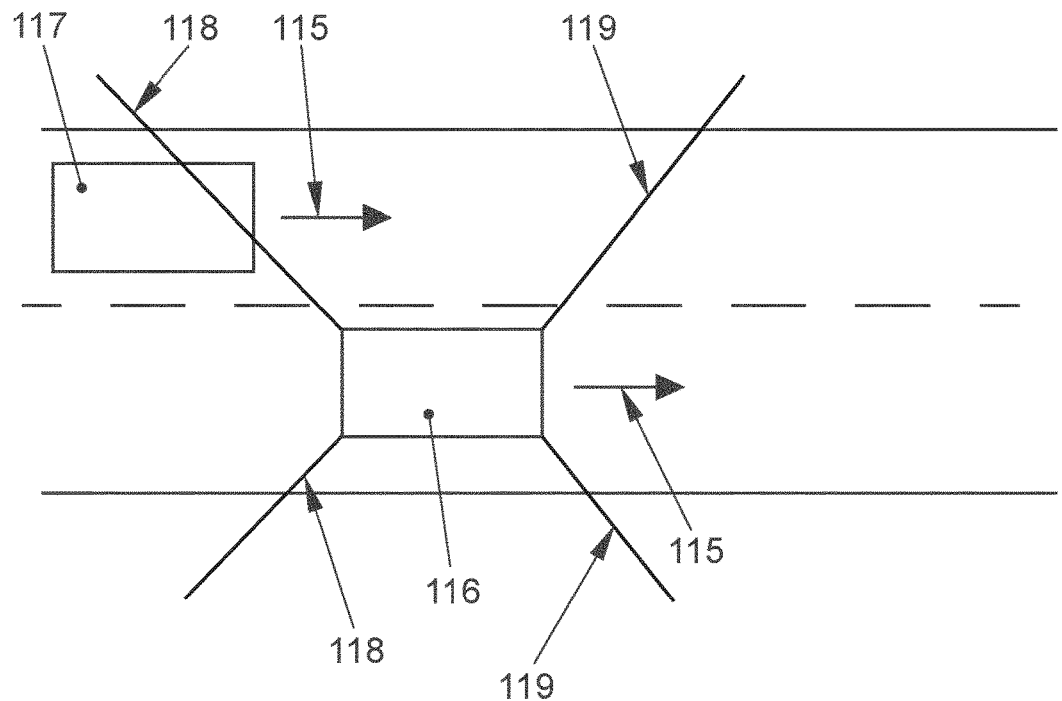
FIG. 11D
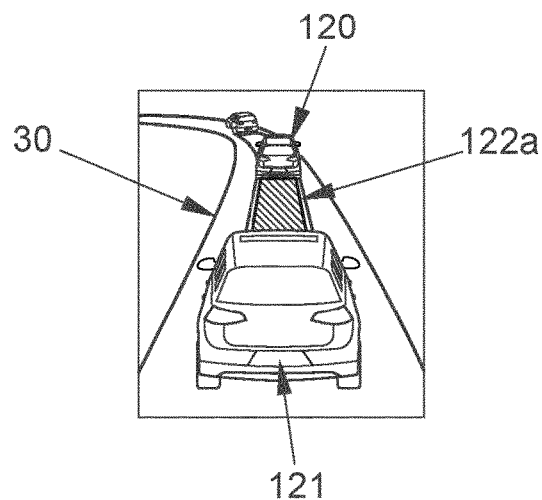 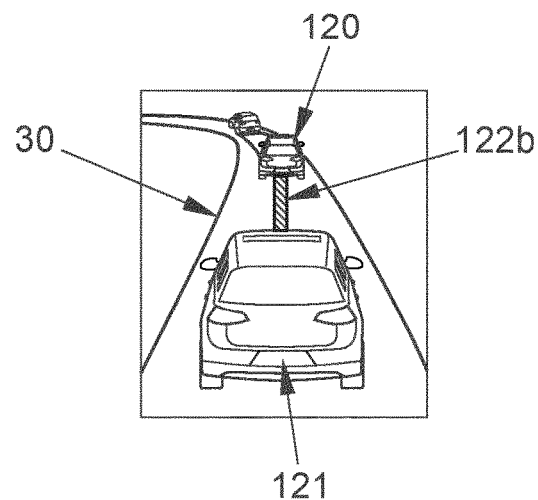
FIG. 12A FIG. 12B

METHOD FOR OPERATING A DRIVER INFORMATION SYSTEM IN AN EGO-VEHICLE AND DRIVER INFORMATION SYSTEM

CROSS-REFERENCE TO RELATED APPLICATIONS

This application claims priority to German Patent Application No. DE 10 2019 202 578.1, filed Feb. 26, 2019 with the German Patent and Trademark Office. The contents of the aforesaid Patent Application are incorporated herein for all purposes.

TECHNICAL FIELD

The present invention relates to a method for operating a driver information system in an ego-vehicle, as well as a driver information system in an ego-vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern vehicles frequently offer a comprehensive selection of various systems that assist the driver to control the vehicle and therefore contribute to an improvement in comfort and safety. One of the challenges in this regard consists of configuring the interface between the human driver and typical computer-based controlling so that the driver is provided with all necessary and desired information as fast as possible and in an easily perceptible manner. Only then may the options for assistance be optimally understood and used. Moreover, the driver must know precisely at every time how his vehicle will behave in a certain situation, which assistance systems are currently active, and whether their optimum functioning is ensured. He should further know how these systems are functioning and the extent to which manual intervention is necessary.

In the following, a "driver assistance system" is understood to be an apparatus of a vehicle that assists the driver to drive the vehicle. Such driver assistance systems may be configured as pure information systems that assist the driver; however, they may also control and regulate apparatuses that automatically influence the locomotion of the vehicle.

By using driver assistance systems, various degrees of vehicle control automation may be achieved. Without an activated driver assistance system, the driver directly influences the movement of the vehicle. If need be, signals or movements of control elements actuated by the driver, such as pedals, the gearshift lever or the steering wheel, are transmitted to corresponding apparatuses of the vehicle which influence the locomotion of the vehicle. Such locomotion of the vehicle corresponds to the lowest degree of automation.

In the case of a higher degree of automation, apparatuses are intervened with partly automatically, which aid the locomotion of the vehicle. For example, the steering of the vehicle or the acceleration in the positive or negative direction is intervened with. In the case of an even higher degree of automation, apparatuses of the vehicle are intervened with such that certain locomotion types of the vehicle, for example straight-ahead driving, may be executed automatically. With a maximum degree of automation, for example routes from a navigation system may be driven substantially automatically, or the vehicle may for example drive automatically on a highway even without a given route. In doing so however, it is generally ensured that the driver may also immediately recover the control of driving the vehicle, even when there is a high level of automation, by actively steering or by actuating the pedals. Moreover, the control may be returned to the driver when a system error arises, or a section that cannot be automatically driven is discerned.

The various driver assistance systems thereby also satisfy various safety functions. Given a low level of automation, only information is output to the driver through a driver assistance system or several driver assistance systems that influences the driver in the way in which he moves the vehicle. When there is a higher level of safety functions, warnings are output that require an immediate reaction from the driver. With this level of automation, the driver assistance systems do not, however, intervene actively and automatically in the operation of the apparatuses that influence the locomotion of the vehicle. In the case of an even higher level of automation, apparatuses are intervened with partly automatically, which aid the locomotion of the vehicle. With an even higher level of automation, there is sufficient intervention in vehicle apparatuses that influence vehicle locomotion for certain maneuvers of the vehicle to be automatically performable, such as for example emergency braking or an intentional escape maneuver to avoid a collision.

The driver of the vehicle is made aware of certain hazards from the notices output by the driver assistance systems. This increases safety while driving the vehicle. When there is an active intervention by a driver assistance system in the locomotion of the vehicle, hazardous driving situations such as collisions or uncontrolled movements of the vehicle may also be avoided when the driver does not directly intervene in the driving process. However, with respect to the safety functions of the driver assistance system, the driver retains for example the full control and responsibility for the driving situation. The driver assistance system intervenes for example in the event of a collision hazard, or if the driver is no longer able to drive the vehicle, such as for health reasons.

In addition to the direct effect on the controlling of the vehicle where appropriate, it is typically provided in driver assistance systems that the driver is informed of the activity of the driver assistance system with a certain depth of detail. For example, this may be done using visually, acoustically or haptically perceptible signals. This ensures that the driver may estimate the influence of a driver assistance system on driving and may intervene in a controlling manner if appropriate: Furthermore, the driver should typically discern automatic interventions in controlling early on so as not to be surprised by them.

Driver assistance systems that may intervene partially automatically in the controlling of the vehicle and/or notify of potentially hazardous situations through warnings may for example relate to transverse control or longitudinal control of the vehicle. Combinations of these fundamental elements of vehicle control are also conceivable. The transverse control component relates for example to the position of the vehicle perpendicular to the direction of travel, i.e., for example the so-called transverse position on a lane or road. Accordingly for example, an assistant for keeping in a lane may prevent driving over a lane limit, or the vehicle may be driven in the middle of a lane. Furthermore, the driver may be assisted with a lane change or with an overtaking maneuver. Longitudinal control relates for example to the speed of the vehicle in the direction of travel that for example is determined depending on legal provisions and road conditions, as well as a safety distance to be maintained from further road users. A corresponding driver assistance system may assist the driver for example maintain a given speed and/or a distance from a preceding vehicle. Furthermore, one's own ego-vehicle may be prevented from passing on a certain side; for example, passing on the right in right-hand traffic, or respectively passing on the left in left-hand traffic is prevented, or corresponding warnings are produced.

The driver of a vehicle always has to know exactly in which configuration the vehicle is moved. A trailer in this case may have a particularly significant influence on the driving behavior of the towing vehicle, for example the functioning of apparatuses of the vehicle or driver assist systems may be influenced or impaired thereby.

SUMMARY

An object exists to provide a method for operating a driver information system in an ego-vehicle in which a driver of a vehicle may perceive in a manner which is particularly simple and rapid whether and in which manner he has to take into account a trailer.

The object is solved by a method and a driver information system according to the independent claims. Embodiments of the invention are described in the dependent claims, the following description, and the drawings.

BRIEF DESCRIPTION OF THE DRAWINGS

FIG. 11A to 11D show exemplary embodiments of driver information displays with unclassified and classified further road users;

FIGS. 12A and 12B show exemplary embodiments of driver information displays while the ego-vehicle is following.

DESCRIPTION

Figure 1:
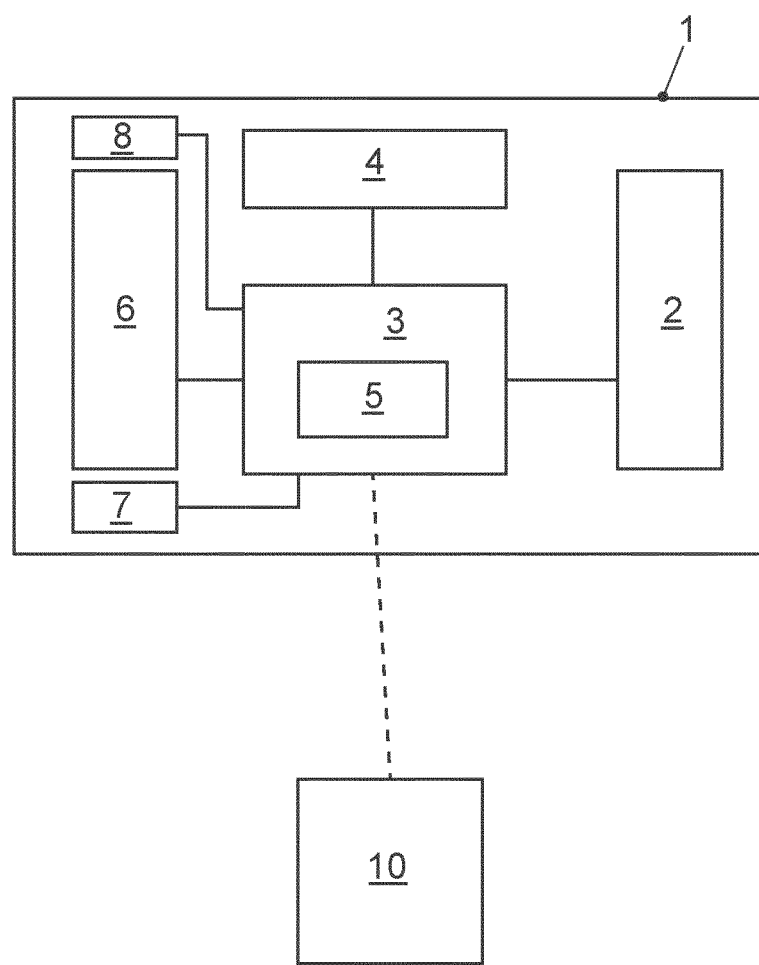
FIG. 1 shows a vehicle with an exemplary embodiment of a driver information system.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the method according to the a first exemplary aspect, an operating state of a trailer device of the ego-vehicle is recorded. A driver information display is generated and output, wherein the driver information display comprises an ego-object which represents the ego-vehicle. In this case, the ego-object is depicted from behind in a perspective view and the driver information display also comprises a lane object which represents a road section lying in front of the ego-vehicle in the direction of travel. The driver information display also comprises a trailer object which is formed according to the recorded operating state of the trailer device and which represents an attached device.

In the case of such a driver information display, the driver is able to better assess the behavior of the ego-vehicle and adapt the control thereof to the circumstances. In contrast to a method in which the ego-vehicle with a trailer is displayed from a plan view or a different view, in particular not a perspective view, in the method according to the present exemplary aspect the driver may perceive the driving situation in a particularly simple manner since the driver information display is brought closer to his own perspective. Even in the case of further depictions in which the presence of a trailer is displayed by an icon or symbol, for example, the driver cannot perceive the current driving situation in the same clear manner.

In the case of the perspective view, the ego-vehicle is depicted from behind, i.e., from a rear view, in which the rear side of the ego-vehicle is depicted. For the purposes of the following description, the rear of the ego-vehicle comprises a region of the ego-vehicle which from the viewpoint of the driver is arranged to the rear in the case of forward travel.

The trailer device may be configured in a manner known per se. The trailer device is suitable for coupling an attached device such that this attached device is entrained with the ego-vehicle's own movement. For example, it may be a trailer or a bicycle carrier. The trailer device comprises, for example, electrical connections for transmitting electrical power and/or electronic data. As a result, a lighting system of the attached device may be activated and/or supplied with electrical energy, for example.

The trailer device may also comprise sensors which serve for recording the attached device. This may take place, for example, by an applied mass and/or tensile force being detected with a vehicle movement. Alternatively or additionally, a recognition feature of the attached device may be recorded and identified, for example by optical recording of a machine-readable code, for example a barcode or QR code, by image recognition using image data, which incorporate the device, using an electromagnetic signal, for example by means of an RFID chip or using other signals which, for example, may be recorded via the electrical connections of the trailer device. Alternatively or additionally, other methods may be used for recording or for more accurate determination of the device. In this manner, for example, it is possible to detect whether a device is attached and which type of device it is.

In the present exemplary aspect, the operating state of the trailer device is recorded and the driver information display comprises a graphic trailer object which is formed according to the recorded operating state of the trailer device. In this case, the ego-object is beneficially depicted such that the driver may perceive the configuration of the ego-vehicle in a particularly simple manner.

For example, the graphic trailer object represents a device which is actually attached to the trailer device of the ego-vehicle. This may be, for example, a trailer or a bicycle carrier. For example, information which has been determined when recording the attached device, for example about the type of device, is used to this end. The graphic depiction of the physical trailer device may also be configured schematically so that no photographic or similarly detailed reproduction is carried out but merely specific characteristics are reproduced. For example, the characteristics of the device may include an extension in a spatial direction, a color, a type or a model.

This is beneficial primarily when the attached device, for example, blocks a recording region of a sensor, for example in the recording region of a camera. This may lead to specific driver assist systems not being able to be used, or only to a limited extent. The driver information display thus assists the driver in identifying how he may assume that the assistance is at least partially automatic.

In some embodiments, it is recorded that the function of a driver assist system is limited in its function by an attached device, and the ego-object and/or the trailer object is configured according to the driver assist system and/or the functional limitation. For example, the depiction may comprise a darkly marked region which indicates a limited recording region of an optical sensor.

In the method according to the present exemplary aspect, a driver information display is generated and output. Such a display may be designed in different ways and may include elements that are known per se. The display is generated and output for example in a way known per se by means of computing devices and display devices configured therefor. The display output by the driver information display includes output that is of relevance for controlling the vehicle and its driving. These are for example movement data or states of vehicle systems, as well as if applicable informational and warning output from driver information systems.

The display may be output by means of known display units such as by means of a display, for example on a center console of the ego-vehicle, or in an instrument cluster. Furthermore, output may be by means of a field of vision display so that at least part of the driver information display is projected into a user's eye so that the display appears superimposed over the visual perception of the physical environment. For example, methods and devices from the field of augmented reality may be used. Known field-of-vision displays such as head-up displays use for example the windshield of a vehicle or glasses for projecting.

The output display does not include for example an output of a video image that is recorded by a camera of the ego-vehicle. Instead, the output display data are generated by a computing unit, if applicable using video data from a camera, and the output graphic objects are shown schematically or simplified in comparison to real objects.

The driver information display may furthermore include control objects or control elements, for example like a graphic user interface. Such objects may for example represent adjustable parameters or activatable and deactivatable functions. They are for example generated to be selectable and/or actuatable, wherein user input is recorded in a manner known per se and evaluated with reference to the particular object.

With the present exemplary aspect, the driver information display is generated with an ego object such that it is depicted from the rear in a perspective view. In doing so, a lane section lying in front of the ego-vehicle in the direction of driving is moreover depicted. The virtual line of vision of the driver information display is therefore oriented so that a lane section is visible on which the ego-vehicle is driving. The lane object may for example refer to the lane currently being used by the ego-vehicle or alternatively or in addition depict a course of other lanes. The lane object may for example be configured as a depiction of a straight lane section in front of the ego-vehicle.

The recorded course of the road includes for example information on whether, and to what extent, a route traveled by the ego-vehicle has a lateral curvature. The recorded data may also relate to other properties of the lane, such as an angle of the lane in a direction longitudinal or transverse to the direction of travel of the ego-vehicle. For example, the data recorded on the course of the road include information on the geometric nature of the lane. The ego-vehicle travels for example on a road that may have several lanes. Typically, the ego-vehicle follows the course of one of the lanes as it is driving, wherein a lane change to another lane may be made if desired. The recording of the course of the road may include the course of the currently used lane, or several lanes.

The graphic lane object is for example generated so that it permits the user, or respectively the driver of the ego-vehicle, to bring graphic elements from the driver information display into a spatial relationship with the lane that actually lies in front of the ego-vehicle. The lane object may relate to the lane currently being used by the ego-vehicle. It may furthermore relate to a lane on which the ego-vehicle will foreseeably travel through a curve, for example if, before entering the curve, a lane change is to be carried out. The lane object may furthermore include a plurality of lanes, for example the lane currently being driven on by the ego-vehicle, and at least one spatially adjacent lane, for example an adjacent lane for the same direction of travel. However, the depiction may also include a personal lane object and at least one adjacent lane object.

The graphic lane object represents the actual course of the road, for example such that the user may assign a virtual position within the driver information display to a physical location on the road located in front of the ego-vehicle. The depiction of an ego object that represents the ego-vehicle may be such that an improved orientation of the driver within the driver information display, and relative to the depicted lane object, is achieved. In terms of its detail content, the depiction of the lane object is reduced or schematic in comparison to reality. For example, the view of the physical lane from the perspective of the driver of the ego-vehicle may be represented mathematically on the graphic lane object by a projection and transformation.

The driver information display does not include for example any depiction of image data that are recorded by a camera. Instead, the instantiations of the depicted objects are generated by a computing unit.

The graphic lane object includes for example a perspective view of a curved lane, wherein the curvature of the graphic lane object corresponds substantially to the radius of curvature recorded for the physical course of the road. The actual course of the road is therefore represented very realistically by the graphic lane object. The lane object is for example generated from a perspective that corresponds to a view from a virtual position just above the ego-vehicle.

In some embodiments, the road path lying in front of the ego-vehicle is recorded by means of sensors of the ego-vehicle and the lane object is formed such that it corresponds to a perspective depiction of the road path and comprises a radius of curvature such that the actual radius of curvature of a curve of the road path is output. The driver information display therefore permits a particularly realistic estimation of the driving situation.

The sensors of the ego-vehicle comprise, for example, a camera, a lidar sensor or a radar sensor. Information on the actual environmental conditions in a specific driving situation are therefore available. For example, data may be used that are provided by driver assistance systems which are known per se, for example by a lane change or overtaking assist.

The sensors of the ego-vehicle each have a recording area. For example, a radar sensor may record data at a specific spatial angle and up to a specific distance from the ego-vehicle. The sensors may be directed in the direction of travel, against the direction of travel or to the side, and may record data in correspondingly arranged recording areas.

In some embodiments, a position of the ego-vehicle is determined, and the course of the road is recorded by means of map data and by using the determined position. This makes it possible to use environment data included in the map data and other information for the driver information display. For example, the map data may include information on the radius of curvature of the curve of the course of the road. For example, it may furthermore be discerned whether a certain lane is authorized for oncoming traffic, for example on a one lane road or on a highway.

The position of the ego-vehicle is recorded in a manner known per se, for example by means of a navigation satellite system such as GPS. The map data are also provided in a manner known per se, for example from a memory unit of a navigation system of the ego-vehicle, or from an external unit with which at least a temporary datalink exists.

The data link between the ego-vehicle and an external unit, for example an external server may for example be wireless, for example through a local network or a larger network, such as the Internet. Furthermore, the link may be established by a telecommunications network such as a telephone network, or a wireless local area network (WLAN). Furthermore, the data link may occur by connecting a data cable. The link may also be established by another unit that itself may establish a link to the external server. For example, a data link may exist between the ego-vehicle and a cell phone connected to the Internet, for example by a data cable or a radio connection such as by Bluetooth. For example, the link with the external server may be established over the Internet.

Methods from the field of communication between vehicles and other apparatuses (Car2X) may be used. For example, communication with an infrastructure apparatus (Car2Infrastructure) or another vehicle (Car2Car) may occur.

For example, environment data that are recorded by means of a sensor may be fused with map data in order to add information or check its plausibility. For example, a very comprehensive database may be obtained in this matter, and the recorded data may be very easily supplemented thereby. Accordingly for example, it may be determined by using the map data whether oncoming traffic is to be expected on a lane, and in another step, it may be determined by means of sensor data whether in fact oncoming traffic is being recorded on the lane.

Moreover, it may be determined whether a change of lane is permitted at a position, for example in a region where overtaking is prohibited. Moreover, the map data may comprise information about whether a lane change may be generally assumed to be safe at a specific position. The lane object may be depicted differently depending on the possibility of a lane change, so that the driver may perceive whether he is allowed to carry out a lane change.

In some embodiments, it is evaluated whether a lane change to an adjacent lane may be carried out safely. For example, environmental data recorded by sensors of the ego-vehicle are used to this end. The driver information display comprises an adjacent lane object, wherein the adjacent lane object has a graphic depiction feature which is formed according to whether the lane change may be carried out safely. As a result, the driver may easily identify whether it is possible to carry out a lane change to a specific adjacent lane safely.

A lane change is safe when there is no risk of collision with a further road user or a further object; optionally legal restrictions such as prohibited overtaking or a prohibited lane change may be taken into consideration. Objects and further road users are recorded in an environment of the ego-vehicle by means of the sensors. For example, road users on the adjacent lane for which a lane change is to be evaluated are relevant.

It is recorded whether a different road user is currently located in a region of the adjacent lane on which the ego-vehicle would travel in the case of a lane change. It is also recorded whether a different road user will be located at a future time in such a region if the ego-vehicle were to travel in this region, if it were to undertake a lane change. This may relate to other road users who currently travel adjacent to the ego-vehicle, who approach at a greater speed from behind or who travel at reduced speed in the direction of travel in front of the ego-vehicle. An acceleration of a further road user may also be recorded and taken into consideration.

Alternatively or additionally, the safety of a lane change may be determined in a different manner. In this case, different environmental data may also be recorded and different features determined using the environmental data.

In some embodiments, the graphic depiction feature of the adjacent lane object which is formed according to the possibility of a safe lane change relates to a brightness, color, transparency, a contrast or a pattern. The driver may identify in a particularly simple manner, for example by the depiction of a flat graphic object, whether a safe lane change is possible.

Alternatively or additionally, other known ways of graphic depiction may be used and, for example, the highlighting of specific objects in a graphic depiction. For example, dynamic depiction modes may also be used, for example by a parameter of the depiction periodically changing, such as for example by changing the brightness with flashing or pulsing or by a periodic color change.

In some embodiments, environmental data are recorded in an environment of the ego-vehicle and a level of automation of a driver assist system of the ego-vehicle is determined. In this case, the driver information display comprises a graphic depiction of the environment which is formed according to the specific level of automation. In this case, for example, initially an operating state of the driver assist system may be determined, the level of an automation being subsequently determined thereby. As a result, the driver may identify in a particularly simple manner to what extent an intervention is automatically carried out in the vehicle control.

The driver information display comprises, for example, a depiction of the environment which is all the more comprehensive the higher the level of automation. For example, a driver assist system may be operated such that automatic interventions are carried out in a lateral and/or longitudinal control of the ego-vehicle. In this case, for example, a first level of automation is defined such that either the automatically assisted lateral control or the automatically assisted longitudinal control is activated. Moreover, in the example, a second, higher level of automation is defined such that both the lateral and the longitudinal control are automatically assisted.

In the case of a lower level of automation, for example, the ego-object is formed such that it is only visible in section. For example, the depiction is generated from a position in the ego-vehicle or is generated above the ego-vehicle and, for example, a front part of the ego-vehicle is depicted. Moreover, in the case of the lower level of automation, the driver information display may be configured such that further road users are only displayed when they are used as control objects, for example for automatic distance control.

In the case of a higher level of automation, for example, the ego-object is formed such that it is displayed fully from a view from behind. The depicted perspective view may be taken, for example, from a virtual position behind and above the ego-vehicle. In this case, the virtual region depicted around the ego-object may be configured to be larger. For example, adjacent lanes are displayed. Moreover, further road users may be displayed even when they are not used as control objects. It may be communicated to the driver that the driver assist system has a particularly comprehensive database which safely permits a high level of automatic control. The driver may also verify whether the depiction coincides with his perception of the driving situation and optionally intervene to implement corrective measures.

In some embodiments, a boundary marking on the road section lying in front of the ego-vehicle in the direction of travel is determined using the recorded environmental data and a boundary marking class is determined for the specific boundary marking. The driver information display comprises a graphic boundary object which is formed according to the specific boundary marking class. The driver information display therefore allows the driver to be very easily oriented so that he may assign display elements to directly perceived elements of the traffic situation.

For example, lane markers are recorded, assigned to a demarcation marker class, and correspondingly output in the driver information display as a demarcation object. The demarcation object is for example arranged on the road object and depicts characteristics of the recorded lane markers. Accordingly for example continuous and broken lines, double lines and other lane markers may be depicted. The depicted demarcation object also follows for example the actual course of the road, for example in the area of a curve.

In some embodiments, a radius of curvature of a curve lying in front of the ego-vehicle is determined, and movement data of the ego-vehicle are recorded. By using the recorded movement data and the detected radius of curvature, a criticality is determined, and a graphic lane object is generated with a highlight feature that is generated depending on the determined criticality. The driver may therefore perceive quickly and easily whether and how he must intervene in the controlling of the ego-vehicle in order to ensure safe driving.

In some embodiments, the movement data of the ego-vehicle include its current speed or a forecast speed upon entering the curve. The output may therefore be adapted very precisely to the actual requirement.

The current speed of the ego-vehicle may be recorded in a manner known per se by sensors of the ego-vehicle. Furthermore, it may be determined, for example by means of a driver assistance system, which speed the ego-vehicle will have upon reaching a certain position, for example when entering the curve. If for example the ego-vehicle is already being braked at the current point in time, the speed at which the ego-vehicle will foreseeably reach the beginning of the curve is accordingly determined. Braking may be accomplished for example by actively using a brake device, or the ego-vehicle may already be decelerated by the driver releasing the gas pedal or letting the ego-vehicle coast.

Furthermore, other movement data may be recorded such as an acceleration in a direction along and/or transverse to the direction of travel.

In some embodiments, other vehicle parameters are recorded, and the criticality is furthermore determined by using the other vehicle parameters. Since data may also be taken into account beyond the movement data of the ego-vehicle, the criticality may be assessed very precisely.

In addition to the movement data of the ego-vehicle, i.e., for example the speed, other data may also be recorded that influence the safe negotiation of the curve and for example the adhesion between the tires of the ego-vehicle and the lane surface. This includes for example data on the type, the composition, the state and the age of the tires of the vehicle or chassis adjustments.

The criticality determined in the embodiments quantitatively indicates for example the necessity with which a manual intervention by the driver is needed in order to ensure safe driving. For example, it may be necessary to manually adapt the speed of the ego-vehicle, and/or manually apply a certain steering torque. In doing so, a physical model is used for example in order to determine whether centrifugal forces arise at a speed and the determined radius of curvature of the curve that would lead to a departure from the lane, or respectively the planned trajectory. In doing so, for example additional parameters are taken into account that for example affect the transmission of force between the road and the vehicle.

Moreover, it may be taken into account that standards and regulations for driver assistance systems in the area of transverse control provide limit values for the maximum steering torque to be automatically applied. That is, if required by the radius of a curve and the speed of the ego-vehicle, the driver must then manually apply additional steering torque in order to achieve an overall steering torque above the threshold value. The criticality therefore depends for example on the steering torque that must be applied in order to safely negotiate the curve at the current speed of the ego-vehicle. This may be calculated by using a physical model depending on the radius of curvature of the curve and the speed, as well as if applicable other parameters.

The criticality may furthermore depend on the type of measures to be introduced. For example, a first value of the criticality may be determined if a deceleration of the vehicle must be initiated in order to drive on the curve with an unchanged level of assistance from a driver assistance system. A second value of the criticality may be determined if a steering intervention is needed. Furthermore, a third value of the criticality may be determined if both a deceleration as well as a steering intervention must be done manually in order to safely negotiate the curve.

The highlight feature of the graphic lane object is configured in a manner known per se and may comprise a highlighted depiction for example by means of color, brightness, contrast, transparency, saturation or shape which directs the attention of a user to a certain object. Colors for highlighting that are typically also used for outputting warnings may for example be red, yellow and green. In contrast, certain color depictions may evoke a deemphasized highlight, for example with gray, dark or less strongly saturated coloration. Furthermore, a highlight may be achieved by means of a depiction of the lane object that changes over time, for example by a periodic change of the depiction, for example by flashing or pulsing, or by the sudden appearance or disappearance. A change in the depiction over time may refer to a shape or a one-time or periodically depicted change in size of the depicted graphic object. The highlight feature may also be configured as another graphic object such as a frame or a border of the lane object.

The form of the highlight feature depends on the determined criticality. For example with a low criticality, the highlight feature may be configured so that it evokes a weak emphasis, for example a depiction of the lane object without a border, or a colored design that is configured to make surrounding graphic objects similar for example in terms of brightness, color and contrast. With a higher criticality, a border or a further highlighted object may be displayed, or the depiction of the lane object may be different from the surrounding graphic objects for highlighting, for example by a contrast-rich depiction in terms of brightness and/or color, or by using a signal color such as yellow or red.

In some embodiments, road surface features are furthermore recorded, and the criticality is furthermore determined by using the recorded road surface features. The criticality may therefore be determined more reliably not just by using geometric features of the road, but also by using other relevant features of the road surface.

The road surface features relate for example to parameters that are relevant to the transmission of force between the vehicle and the road surface. For example, wetness, snow, ice, oil or other contaminants on the road may cause the adhesion between the tires and the road surface to worsen, and a curve must be negotiated at a slower speed. Furthermore, the type of road surface may depict relevant information in this context.

The road surface features are recorded in a manner known per se. For example, sensors of the ego-vehicle may be used such as a camera, a rain sensor, or a sensor system for measuring the adhesion between the tires and road surface, or the wheel slip arising on the surface. Alternatively or in addition, user input or data from an external apparatus may be recorded such as weather data for the position of ego-vehicle, or respectively the position of the curve. To accomplish this, for example data on Car2Infrastructure, Car2X or Car2Car communication may for example be received, wherein a traffic infrastructure, an external unit and/or another vehicle record data on the road surface features and provide said data to the ego-vehicle.

In some embodiments, the graphic lane object furthermore has a depiction parameter that is generated depending on the road surface features or weather data. Consequently, the driver may be easily notified of circumstances in any easily perceptible manner that may impair driving through the curve and make it necessary to undertake certain measures.

The weather data may be recorded in various ways, for example by means of sensors of the ego-vehicle such as a rain sensor or a camera, or by receiving data from an external unit such as an external server. For example, the current position of the ego-vehicle or the position of the curve may be recorded and used for providing the weather data.

The depiction parameter may relate to a texture or a background image in the area of the lane object. Alternatively or in addition, an edge area of the lane object such as a depicted lane marker may be depicted in various ways, for example in a certain color. For example, it may be detected that the lane is wet, or that rain is currently falling or has fallen in the recent past. A form of depicting the graphic lane object may then be generated that depicts a wet lane. Analogously, a graphic depiction of a snow or ice-covered lane may be generated. The depiction may also have a certain color or pattern, such as a hatching. Moreover, certain visual features may be depicted by using virtual objects in the display, such as a reflection of an object on the surface of the displayed lane object.

In some embodiments, the driver information display also comprises a graphic traffic sign object, wherein the traffic sign object is arranged, for example, on the lane object or on its edge. As a result, the driver may also be made aware of imminent oncoming traffic and recommended measures may be illustrated particularly clearly.

The traffic sign object may be displayed, for example, such that it appears in the manner of a marking on the graphic lane object applied to the road surface. It may also be depicted as a virtual traffic sign arranged adjacently or above the lane in the driver information display.

The depicted traffic sign object may be configured according to a physical traffic sign which is detected in the environment of the traveled road or the curve when, for example, a warning sign, a speed limit and/or prohibited overtaking has been identified. The traffic sign object may also reproduce a driving recommendation of a driver assist system, for example in order to recommend to the driver to brake the vehicle to a specific speed.

In some embodiments, at least one physical object is identified in the environment of the ego-vehicle using recorded environmental data and its position is determined relative to the ego-vehicle. At the same time, the driver information display comprises at least one graphic object which is assigned to the identified physical object and the position of the graphic object is formed according to the specific position. This permits a particularly comprehensive display of the environment with information relevant to the driver about the driving situation.

The identified physical object, for example, is a further road user in the environment of the ego-vehicle. In this case, the graphic object may be configured as a road user object which represents the further road user. For example, the further road user is assigned a road user class and the road user object is formed according to the assigned vehicle class.

For example, the road user object may be configured differently depending on whether the other road user is a passenger motor vehicle, truck or bus. In further embodiments, further external characteristics of the road user object are formed using the road user class, for example a color, a type or model of a different road user or a different characteristic feature of the external appearance.

According to a second exemplary aspect, a driver information system in an ego-vehicle is provided, comprising a detection unit which is designed to record an operating state of a trailer device of the ego-vehicle, and a control unit which is designed to generate a driver information display and output same. The driver information display comprises a graphic ego-object which represents the ego-vehicle. The control unit is also designed to depict the ego-object from behind in a perspective view and to generate the driver information display such that it also comprises a lane object which represents a road section lying in front of the ego-vehicle in the direction of travel. The control unit is also designed to form the driver information display such that it also comprises a trailer object which is formed according to the recorded operating state of the trailer device and which represents an attached device.

The driver information system is for example designed to implement the above-described method or one or more of the embodiments discussed.

In some embodiments, the display unit comprises a field of vision display for outputting the driver information display.

The display may therefore be very easily perceived by the driver. It may furthermore be very easily set in relation to the physical environment of the ego-vehicle.

For example, a head-up display, or a display apparatus that is known per se in the field of so-called augmented reality may be used. For example, glasses are known that project a graphic depiction into the eye of a user so that the graphic depiction appears superimposed on the natural perception of the eye. In this manner, additional information may be output in a particularly perceptible manner.

The invention will now be explained based on further exemplary embodiments with reference to the drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

A vehicle with an exemplary embodiment of the driver information system is described with reference to FIG. 1.

An ego-vehicle 1 comprises a detection unit 2 which is coupled to a control unit 3. Said ego-vehicle further comprises a display unit 4 and a driver assist system 6 which are also coupled to the control unit 3. In the exemplary embodiment, the control unit 3 comprises an evaluation unit 5 and is wirelessly coupled by a data connection to an external unit 10, in the exemplary embodiment an external server 10. The ego-vehicle 1 furthermore comprises a lighting apparatus 7 as well as a trailer device 8 that is also coupled to the control unit 3.

The detection unit 2 in the exemplary embodiment is designed in a manner known per se and comprises a camera that records image data in a detection area that extends from the ego-vehicle 1 at a certain angle in the direction of travel. It furthermore comprises front, lateral and rear radar sensors that record data in other detection areas around the ego-vehicle 1.

The display unit 4 is also designed in a manner known per se and is integrated in the exemplary embodiment as a display in an instrument cluster of the ego-vehicle 1. In other exemplary embodiments, the display unit 4 comprises a head-up display that is configured so that a display is projected into the field of vision of a driver of the ego-vehicle 1 so that the display is superimposed on the natural perception of the driver. In other exemplary embodiments, more additional apparatuses are provided for outputting displays as are for example known from the field of augmented reality. Alternatively or in addition, the display unit 4 may comprise a central display in the area of a center console of the ego-vehicle 1, or another display in ego-vehicle 1. Moreover, the display unit 4 may comprise several displays.

The driver assistance system 6 comprises several driver assistance modules by means of which the driver of the ego-vehicle 1 is assisted in various ways in the controlling of the ego-vehicle 1. These are not specified further in the exemplary embodiment. Systems are provided for example for assisting longitudinal control, for example an assistant for maintaining a given distance from a preceding vehicle, as well as for maintaining a given speed, as well as for assisting transverse control, for example an assistant for maintaining a travel lane, for example by using lane markers, or by following behind a preceding vehicle. Output may be generated by the driver assistance system 6 and for example output by means of the display unit 4, for example in order to display warnings or recommended driving maneuvers to the driver. Furthermore, various driver assistance modules may actively intervene in control devices of the ego-vehicle 1.

The lighting apparatus 7 comprises various apparatuses that serve as lighting that is capturable outside of the ego-vehicle 1. In the exemplary embodiments, headlamps are included for generating daytime driving light, low beams, high beams and a parking light. Furthermore, turn signals as well as side marker lights and other signal lights are included. Furthermore, taillights, brake lights, retroreflectors, rear fog lights and backup lights are included that for example are arranged on the rear of the ego-vehicle 1 so that they are visible for traffic approaching from the rear.

The trailer device 8 is designed in a manner known per se and includes elements that are suitable for coupling to the attached device. This may for example be a trailer. Electrical connections are also provided for this by means of which for example a lighting system of a trailer may be controlled. The trailer device in the exemplary embodiment furthermore include sensors that detect a mounted mass as well as if applicable traction of a trailer, for example in order to determine the presence of the trailer as well as if applicable its type.

An exemplary embodiment of the method will be explained with reference to FIG. 2. In doing so, the aforementioned ego-vehicle explained with reference to the FIG. 1 with an exemplary embodiment of the driver information system will be referenced and further specified by the description of the method.

Figure 2:
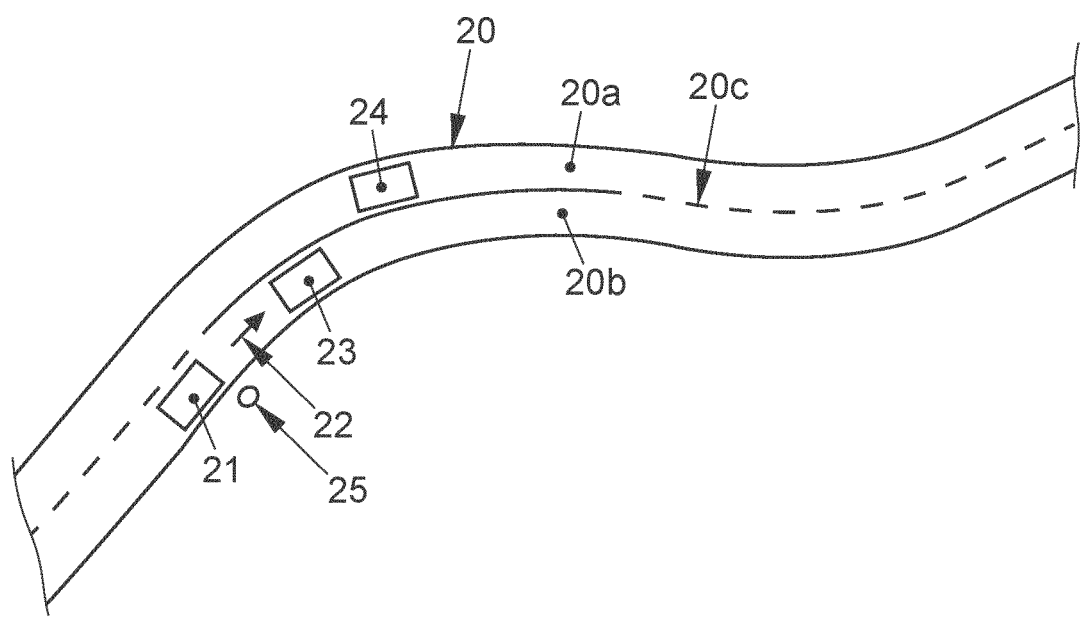
FIG. 2 shows a traffic situation with vehicles on a road.

An ego-vehicle 21 that corresponds in the exemplary embodiment to the ego-vehicle 1 shown in FIG. 1 drives in a direction of travel indicated by an arrow 22 on a road 20 that has two lanes 20a, 20b. A traffic sign 25 is arranged in the area of the road 20. A preceding vehicle 23 is located on the same lane 20b as the ego-vehicle 21, whereas an oncoming vehicle 24 is located on the adjacent lane 20*a*. The lane 20 has a course with curves, wherein in the exemplary embodiment shown in FIG. 2, the ego-vehicle 1 is approaching a right-hand curve followed by a left-hand curve.

By means of the detection unit 2, the ego-vehicle 21 records the course of the road lying in front of it in the direction of travel. To do this, image data are recorded in the exemplary embodiment, by means of the camera included in the detection unit 2 and evaluated in another step in order to determine the course of the road. To do this, for example the geometric configuration of the road 20, or respectively the lane 20*b* currently being driven on by the ego-vehicle 1 is determined. Alternatively or in addition, other sensors of the ego-vehicle 1 are provided for recording in other exemplary embodiments.

By using the data recorded by the detection unit 2, the lane markers that divide the two lanes 20*a*, 20*b* from each other are also recorded. Moreover, additional road markers (not shown in FIG. 2) at the edges of the road 20 are recorded. Demarcation marker classes are determined for the road markers, in the present case a "dashed line" and "solid line", for different areas of the middle line between the lanes 20*a*, 20*b*, and a "solid line" for the edge markers of the lane 20. In other exemplary embodiments, a road marker of the demarcation marker class "double solid line", "parallel broken and solid line" or a similar configuration may also be determined. In addition, a curb or a transition from the road 20 to an adjacent shoulder may be recorded as a demarcation marker and correspondingly classified.

In addition in the exemplary embodiment, the current position of the ego-vehicle 1 is recorded and, by using this position, map data are provided that include information on the course of the road. A fusion of the map data as well as the recorded sensor data is performed, and the actual course of the road in the direction of travel lying in front of the ego-vehicle 1 is determined.

By means of the detection unit 2, the ego-vehicle 21 also records weather data. In the exemplary embodiment, a rain sensor as well as the camera are used for this. Alternatively or in addition in other exemplary embodiments, relevant weather data are retrieved from an external unit 10 by using the determined position of the ego-vehicle 21. Furthermore, data on the weather at the position of the ego-vehicle 21 provided from an infrastructure or for example by radio stations may be captured.

The recorded weather data include information on rain and snow, both at the current point in time as well as in the recent past. From this it is inferred whether the road section lying in front of the ego-vehicle 21 is wet, or has slippery snow. Furthermore, the weather data relate to the danger of slippery ice. For example, the current temperature of the air or the road surface is taken into account for this; if the temperature lies below the freezing point or another threshold value, an icy road is assumed. Other types of precipitation such as hail or sleet are also taken into account.

Furthermore, the detection unit records movement data from the ego-vehicle 21, for example its current speed and acceleration. In other exemplary embodiments, a speed and acceleration of the ego-vehicle at a later point in time is forecast, for example for a forecast point in time of the entry of the ego-vehicle 21 into a curve. In other exemplary embodiments, furthermore other data on the ego-vehicle 21 are recorded, for example on the nature of its tires and adjustments of its chassis that affect the behavior of the ego-vehicle while cornering.

The evaluation unit 5 determines the radius of curvature of the curve lying in front of the ego-vehicle 21 based on the recorded course of the road. In other exemplary embodiments, the radii of curvature of other curves may also be determined, for example to enable more foresighted driving. Then the information on the speed of the ego-vehicle 21 and the radius of curvature of the curve lying in front of the ego-vehicle 21 are used to determine a value of criticality.

To determine the criticality, the steering torque for the ego-vehicle 21 needed to negotiate the curve at the current or forecast speed is determined, for example by the driver assistance system 6. The determined steering torque is compared with a threshold value that is defined in the driver assistance system 6 for a maximum steering torque for automatic assistance in holding the lane 20*b*. If this threshold value is exceeded, the driver assist system 6 cannot intervene automatically to assist with a sufficiently large steering torque in order to enable the ego-vehicle 21 to safely negotiate the curve. That is, the driver of the ego-vehicle 21 must intervene in the controlling of the ego-vehicle 21 by applying additional steering torque and/or reducing the speed by decelerating the ego-vehicle 21.

In other exemplary embodiments, it is determined alternatively or in addition whether the ego-vehicle 1 may physically negotiate the curve safely at the recorded or forecast speed. If it is determined that this is impossible or is associated with risks, it is defined as a higher criticality. In doing so, for example the physically possible transmission of force between the tires of the ego-vehicle 1 and the road surface is taken into account. With a higher criticality, for example braking the ego-vehicle 1 or selecting a greater curve radius is necessary.

In the exemplary embodiment, different driver assistance modules of the driver assistance system 6 may be activated, wherein different levels of automation may also be achieved. The driver may for example select a low level of automation in which the longitudinal and transverse control of the ego-vehicle 1 are substantially manual. The driver may add modules that output warnings or recommendations with respect to controlling; this corresponds to a low automation level. Moreover, the driver may enable modules that take over individual tasks of longitudinal and transverse control; this corresponds to a higher automation level. Furthermore, the driver may enable driver assistance modules that automatically support both longitudinal control as well as transverse control; this corresponds to an even higher automation level. The threshold value for the steering torque that a driver assistance module for transverse control may apply may depend on the specific module or the driver assistance system 6.

Figure 3:
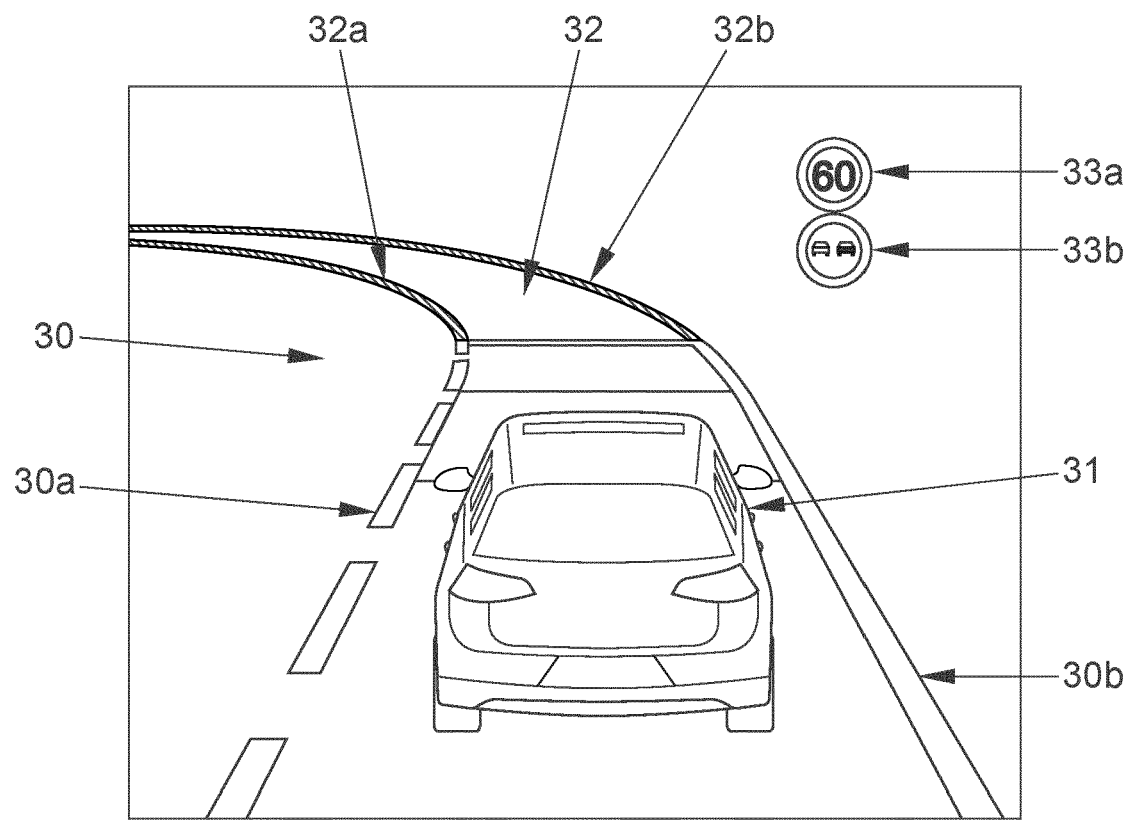
FIG. 3 shows an exemplary embodiment of a driver information display generated by using the teachings herein while cornering.

While driving, the control unit 3 generates a driver information display that is output by the display unit 4. An exemplary embodiment of such a display is shown as an example in FIG. 3.

The driver information display includes an ego object 31 that is configured as a perspective view of the ego-vehicle 21 from the rear from a slightly elevated virtual position so that an area lying in front of the ego-vehicle 21 may also be depicted. The display furthermore comprises a lane object 30 that is arranged so that the ego object 31 is displayed thereupon. The lane object 30 represents the current lane 20*b* on the road 20 actually being driven by the ego-vehicle 21.

In other exemplary embodiments, other graphic objects are displayed for other and for example adjacent lanes that for example are configured analogous to the shown lane object 30.

In the exemplary embodiment, the lane object 30 is bordered by a dashed left 30*a* and a broken right lane marker 30*b*. The depicted marker types correspond to the actual markers on the lane 20*a* according to the previously determined demarcation marker classes. In other exemplary embodiments, the lane markers may be generated by using other criteria, for example in order to symbolize whether a lane change is permissible and possible in the direction of a lane marker.

The lane object 30 represents the recorded course of the physical lane 20*b* on which the ego-vehicle 21 is currently located. A curve located in front of the ego-vehicle 21 is represented by a curve area 32 of the lane object 30. Its geometric shape is generated so that it reproduces the actual radius of curvature of the curve in the perspective depiction The lane object 30 is generated with the curve area 32 depending on the criticality determined for the curve. In the exemplary embodiment, the lane markers 32*a*, 32*b* that border the side of the depicted lane in the curve area 32 are configured so that the driver is notified of a necessary manual intervention. This is done by depicting in a certain color, such as red when the value of the determined criticality exceeds a threshold value. In the exemplary embodiment, the lane markers 32*a*, 32*b* in the curve area 32 are then no longer generated so that they reproduce the actual markers on the lane 20*b*; instead, they are depicted solid in order to notify the driver of their importance in the curve.

In other exemplary embodiments, the lane object 30 has other highlight features than the color of the lane markers 32*a*, 32*b* in the curve area 32 such as a color of the surface of the depicted lane 32 so that the highlighting is over a large area. In other exemplary embodiments, other depictions may be generated depending on the value of the criticality, for example with other colors that are determined by using the criticality value and a scale. Furthermore, dynamic depictions may be generated for example with flashing objects.

In the exemplary embodiment, the driver information display furthermore includes depictions of traffic signs 33*a*, 33*b* that signal a speed limit and a prohibition on passing in the area of the curve. These traffic signs 33*a*, 33*b* may also be displayed in the area of the lane object 30 so that they appear on its surface, or they may be displayed like actual traffic signs 25 on the edge of the lane object 30. The traffic signs 33*a*, 33*b* in the exemplary embodiment correspond to an actual traffic sign 25 arranged on the edge of the lane 20; in other exemplary embodiments, traffic signs may however also be generated by using driving recommendations of the driver assistance system 6, for example when a certain maximum speed for safely negotiating a curve was determined, or when the area of the curve is assessed as being unsafe for passing.

In other exemplary embodiments, acoustically and/or haptically perceptible warning messages may furthermore be output depending on the criticality. Furthermore, other optical warning messages may also be displayed, for example by means of a warning symbol.

In another exemplary embodiment, the driver assistance system 6 is configured to determine whether a speed is reached upon entering the curve that permits safely negotiating the curve. If, despite the highlighting of the curve section 32 in the driver information display, the driver does not initiate suitable measures, safety measures may be automatically initiated in order to bring the ego-vehicle 1, 21 into a safe state. Accordingly, braking may for example be performed that brings the ego-vehicle 1, 21 to a safe speed.

With respect to the exemplary embodiment, it is furthermore proposed that the graphic depiction of the ego-vehicle 31 in the driver information display is arranged at a fixed position. The depiction therefore corresponds to a perspective from a fixed point relative to the ego-vehicle 21, for example from a position of the driver, or a position arranged above the ego-vehicle 21. The depiction is generated so that a movement is depicted while driving so that other objects that present the environment of the ego-vehicle 21 move relative to the depicted ego object 31. It is shown for example that the lane markers 30A, 30B move relative to the ego object 31, and the arrangement of the lane object 30 also changes relative to the ego object 31. For example, the lane object 30 changes while in negotiating the curve so that its curvature is changeably depicted, and the lane object 30 again runs completely straight for example at the exit of the curved area, or respectively with a changed recorded radius of curvature.

In another exemplary embodiment, further road users are recorded and output as road user objects on the driver information display. The road user objects are displayed relative to the ego object 31 so that the physical position and speed of the associated road users is discernible from the display. The road user objects are also depicted rotated corresponding to the course of the road so that they for example are visible obliquely from the side when they are driving on an area of the road that is curved relative to the orientation of the ego-vehicle 21.

In another exemplary embodiment, the display unit 4 includes a head-up display, and at least the lane object 30 of the driver information display is displayed in this manner. It may for example be displayed so that it appears to be superimposed on the lane 20*b* actually perceived from the position of the driver. The curve area 32 is then highlighted so that the driver may evaluate the criticality in the area lying in front of him and may discern that a manual reduction of speed or an additional application of steering torque is required to safely negotiate the curve.

Another exemplary embodiment of a driver information display that is generated and output in the method while taking into account weather data will be explained below with reference to FIGS. 4A, 4B and 4C. The display is similar to the display explained above with reference to FIG. 3. Only additional features will therefore be explained. Comparable objects are identified with the same reference numbers.

In this exemplary embodiment, the driver information display furthermore includes graphic elements 40*a*, 40*b* for adjacent lanes. These are positioned laterally next to the lane object 30 on which the ego object 31 is arranged and continue the lane to the side in a perspective depiction. In the exemplary embodiment, only lane markers 30*a*, 30*b* are shown at the edges of the lane object 30 for the vehicle's own lane 20*b*. In this case as well, the depicted marker types correspond to the actual markers on the lane 20 according to the previously determined demarcation marker classes.

Figure 4A:
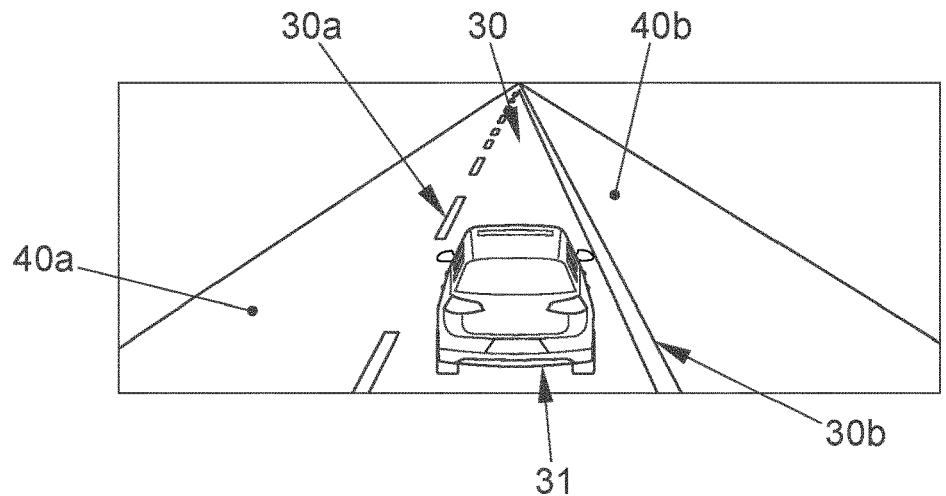
FIG. 4A to 4C show other exemplary embodiments of driver information displays generated by using the teachings herein taking into account weather data.

In the case shown in FIG. 4A, it was detected that the surface of the road is dry. The driving objects 30, 40*a*, 40*b* are shown without any structure, for example uniformly black or gray.

Figure 4B:
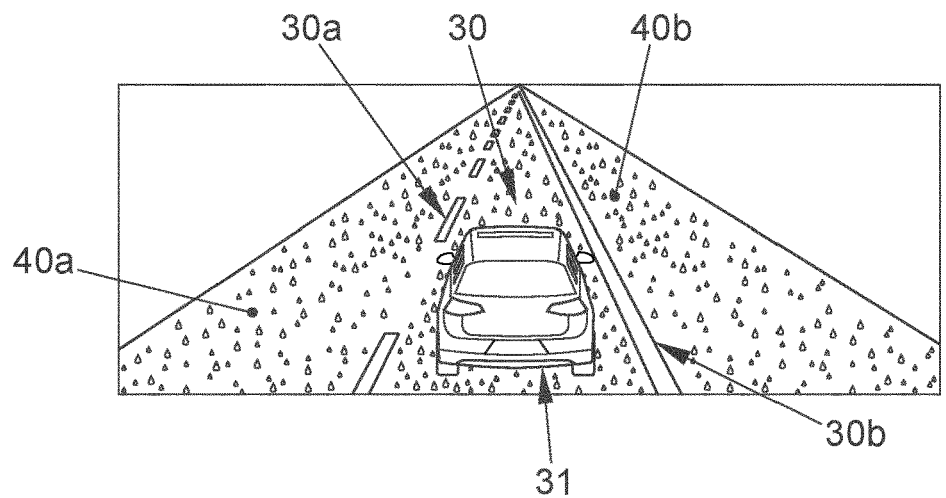

In the case shown in FIG. 4B, it was detected that the surface of the road is wet. The graphic objects for depicting one's own lane 30 as well as the left 30*a* and right 30*b* adjacent lanes are depicted with a pattern that represents raindrops in this example. In other exemplary embodiments, other structures may be depicted; furthermore, dynamic depictions such as moving structures in the area of the graphic objects 30, 40*a*, 40*b* are also conceivable. In another exemplary embodiment, other objects are also depicted such as further road users whose mirror images are depicted on the road depicted as wet with rain. Furthermore, spray may be depicted in the area of road user objects that move over the road.

Figure 4C:
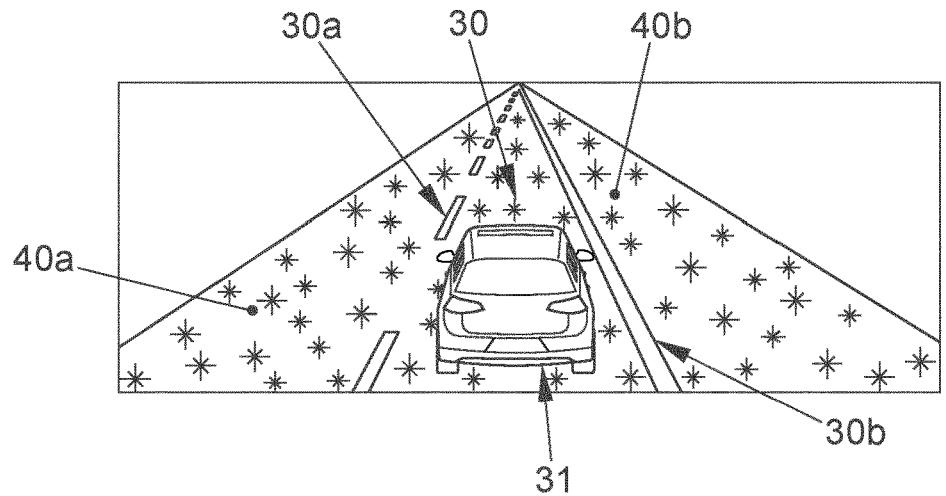

In the case shown in FIG. 4C, it was detected that the road is at least partially covered with snow. Analogous to the case shown in FIG. 4B, the objects for the lanes 30, 30a, 30b are depicted structured in this case as well, wherein a pattern of a snow surface is shown. In this case as well, other structures as well as dynamic depictions are conceivable.

In other exemplary embodiments, the graphic objects for the lanes 30, 40a, 40b are depicted such that other features of their surface are represented. These may be for example contaminants, oil or markers on the lane.

With reference to FIG. 5A to 5D, other displays will be explained that may be generated and output with the method taking into account different types of road markers. In this case as well, the driver information system explained with reference to FIG. 1 will be assumed, and the objects will be identified if possible with the reference numbers already used above.

Figure 5A:
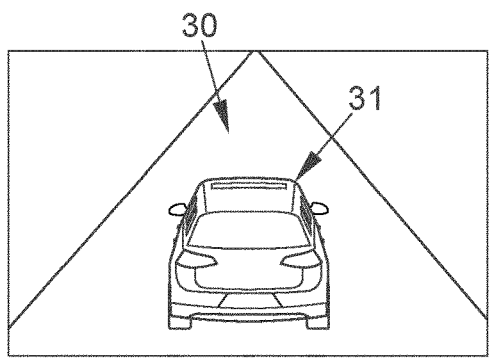
FIG. 5A to 5D show other exemplary embodiments of driver information displays generated by using the teachings herein taking into account various types of road markers.

In the case shown in FIG. 5A, no road markers were recognized on the road 20. Only the ego object 31 that represents the ego-vehicle 21 is depicted as well as a lane object 30 that is shown uniformly gray in the exemplary embodiment. In other exemplary embodiments, other depictions are possible; however, the display is such that no objects comparable with a road marker are displayed. The driver may see from this display that the ego-vehicle 21 is being driven without orientation from recognized road markers so that for example driver assistance systems for transverse control may only be used restrictedly or not at all.

Figure 5B:
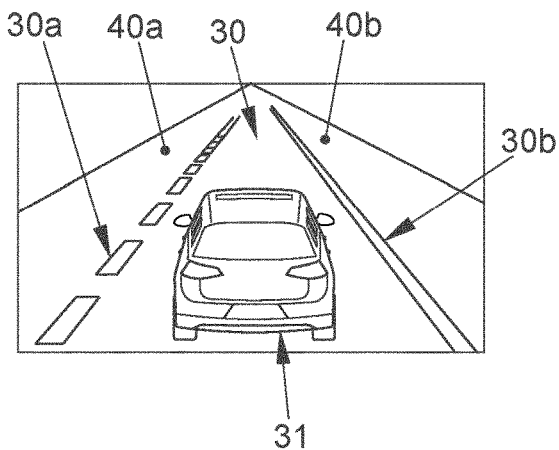

In the case shown in FIG. 5B, it was recognized that the lane 20b on which the ego-vehicle 21 is located is bordered on the left and right by lane markers. These were assigned the demarcation marker classes of "broken lane marker", or respectively "solid lane marker". Furthermore, adjacent lanes were recognized. In addition to the ego object 31 and the lane object 30 that represents the currently used lane 20b, the driver information display also includes graphic objects for the left 40a and right 40b adjacent lanes as well as vehicle markers 30a, 30b that are generated according to the recorded demarcation marker classes and represent characteristics, i.e., the broken, or respectively solid embodiment corresponding to the actual lane markers.

Figure 5C:
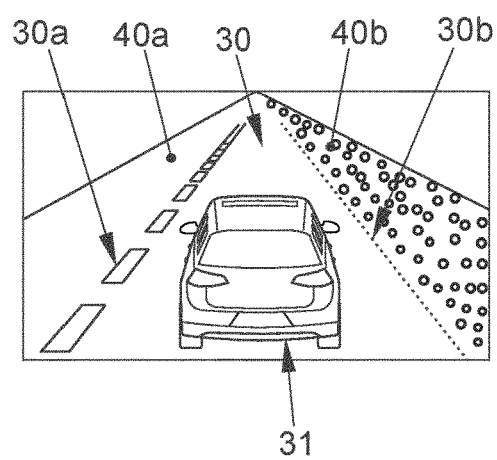

In the case shown in FIG. 5C, it was recognized that, different than the case shown in FIG. 5B, the lane 20b of the ego-vehicle 21 is not bordered by a right lane marker. Instead, a transition from the road to a shoulder area was detected. In contrast to the case shown in FIG. 5B, this is output by the driver information display in that the graphic object 40b depicts a shoulder area for the right adjacent lane that borders the lane object number 30 with the ego object 31.

Figure 5D:
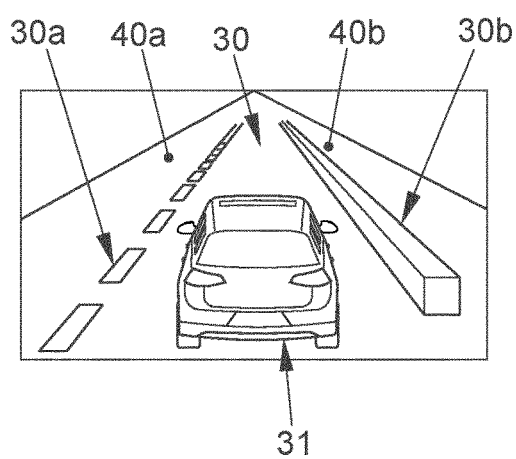

The case shown in FIG. 5D differs from that in FIG. 5B in that the current lane 20b of the ego-vehicle 21 is bordered on the right by a curb. This is displayed in the driver information display in that a graphic demarcation object 30b that represents a curb is depicted on the right next to the lane object 30.

In other exemplary embodiments, road markers may also be guardrails, vegetation or roadside structures, or other demarcation markers and structures according to the various demarcation marker classes.

Figure 6A:
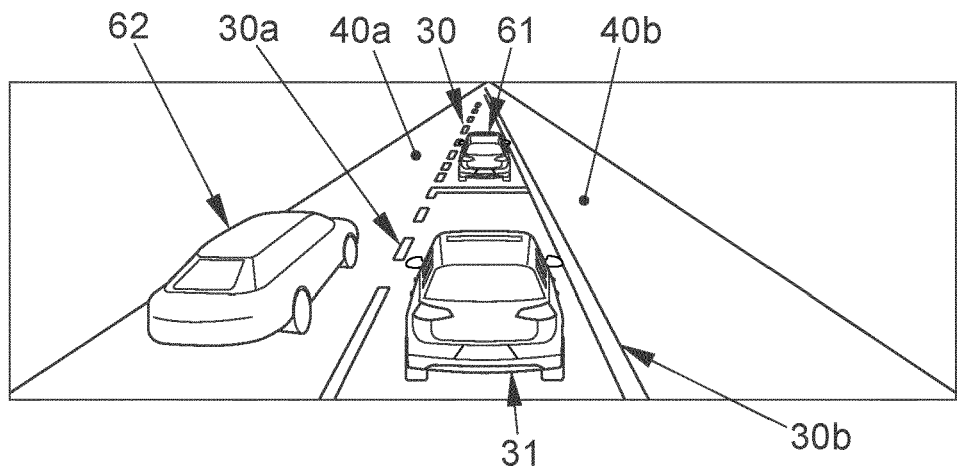
FIG. 6A to 6C show other exemplary embodiments of driver information displays generated by using the teachings herein for a planned lane change.
Figure 6B:
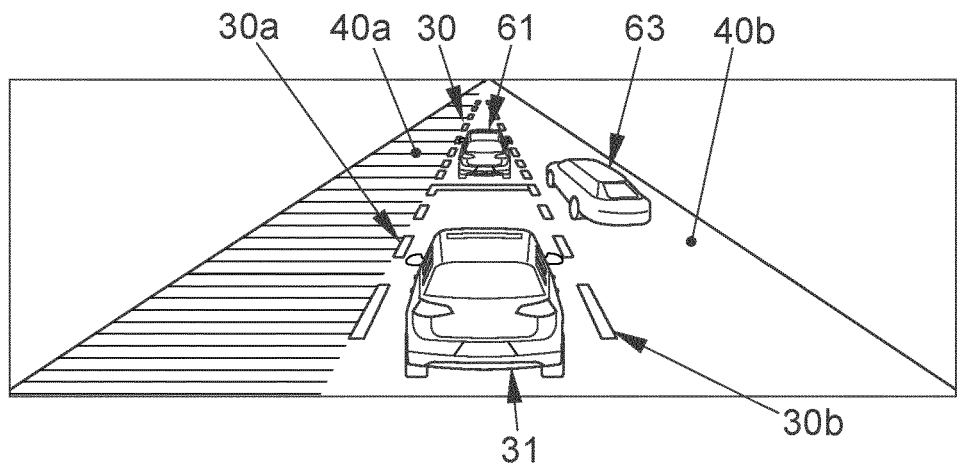
Figure 6C:
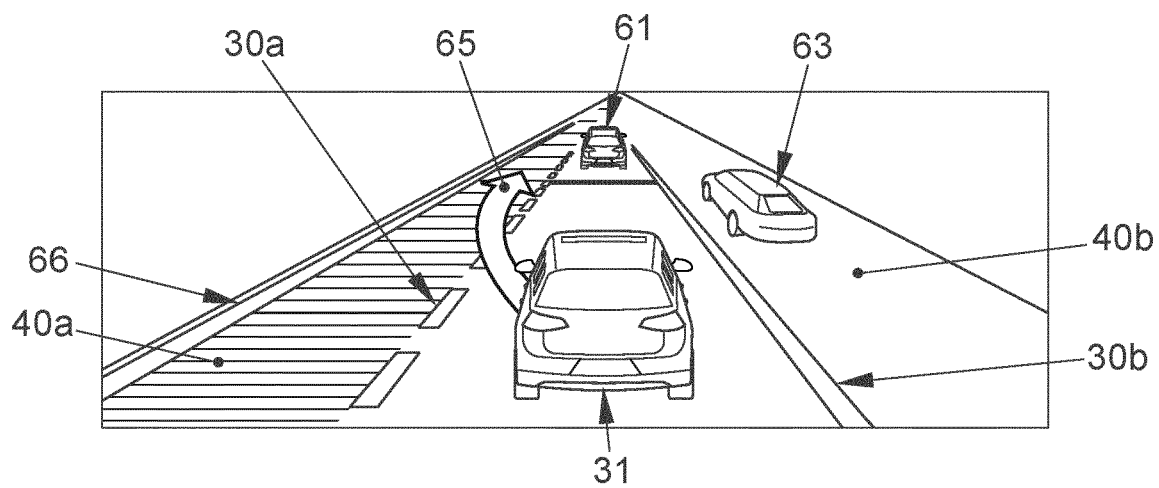

With reference to FIG. 6A to 6C, other displays will be explained that may be generated and output using the method for a planned lane change. In this case as well, the driver information system explained with reference to FIG. 1 will be assumed, and the objects will be identified if possible with the reference numbers already used above.

FIG. 6A to 6C each include an ego object 31 that represents the ego-vehicle 21. This is displayed statically and always arranged at the same position within the driver information display. The movement of the ego-vehicle 21 is depicted in that the depicted environment moves relative to the ego object 31 as it appears from the coordinate system of the ego-vehicle 21. For example, structures of the road move relative to the static ego object 31 including curved areas as well as lane markers 30a, 30b corresponding to the actual proper movement of the ego-vehicle 21 on the road 20.

The perspective of the display is generated from a position slightly behind and above the virtual ego object 31. Each display includes a lane object 30 that represents the currently used lane 20b of the ego-vehicle 21, as well as adjacent lane objects 40a, 40b for adjacent lanes 20a.

In all cases, a preceding vehicle 23 was also detected that will now be represented by a road user object 61 which is arranged in the depiction in front of the ego object 31. The depiction is generated such that the displayed distance between the ego object 31 and object of the proceeding vehicle 61 represents the actual distance between vehicles. That is, by using the display, the driver may perceive the actual distance and may for example notice changes.

The further road user is depicted by the virtual road user object 61 so that features of its real appearance relevant to the depiction are reproduced in the display. In this regard, the vehicle type and the color of the further road user 23 are recorded in the exemplary embodiment. The recording is by a camera of the ego-vehicle 1. Alternatively or in addition, in other exemplary embodiments, a datalink to the further road user is also established, particularly by means of Car2Car communication. The graphic road user object 61 assigned to the preceding road user 23 is then generated so that it correctly reproduces the depiction of the vehicle type. Alternatively or in addition, in other exemplary embodiments, other features of the preceding vehicle 23 may also be reproduced in the depiction of the corresponding graphic road user object 63.

FIG. 6A to 6C furthermore include a horizontal line arranged in front of the ego object 31 on the lane object 30 that depicts a set minimum distance of the ego-vehicle 21 from the preceding vehicle 23.

In the case shown in FIG. 6A, it was recorded that the current lane 20b is bordered on the right by a solid line and on the left by a broken line. The recorded road markers were assigned to corresponding demarcation marker classes, and the demarcation markers are reproduced by depictions of corresponding road markers 30a, 30b.

Furthermore, a further road user was recorded on a lane adjacent on the left that is located at the approximate level of the ego-vehicle 21. The display includes a corresponding graphic road user object 62 on a left adjacent lane object 40a that reproduces the real arrangement of the vehicles. In this driving situation, it was determined that the ego-vehicle 21 cannot safely change to the left adjacent lane. The left adjacent lane object 40a is therefore not highlighted but is rather colored a uniform gray.

In the case shown FIG. 6B, a further road user was also detected on an adjacent lane, but this time on the right adjacent lane, however. The driver information display therefore includes a road user object 63 in the area of the right adjacent lane object 40b. It was determined that a lane change to the left adjacent lane may be done safely. The left adjacent lane object 40a is therefore highlighted. In this and other exemplary embodiments, various highlights may be used, for example by means of hatching, color, brightness, or by a dynamic effect such as flashing.

In the case shown in FIG. 6C, it was furthermore detected proceeding from the case explained above with reference to FIG. 6B, that the driver of the ego-vehicle 21 has activated a left blinker. With this, he signals that he wants to perform a lane change to the left. The ego object 31 is output in the depiction with a shining flashing light. Since in the depicted driving situation the lane change to the left may be done safely, an arrow 65 is displayed as a signal object 65 in addition to highlighting the left adjacent lane object 40a. The case is for example configured to be the color green. In other exemplary embodiments, the color may depend on whether the lane change may be done safely; if this is not the case the arrow 65 may for example be colored red. Furthermore, the signal object 65 may also be configured differently, for example like chaser lights or with another symbol.

In the case shown in FIG. 6C, it was furthermore recorded that the left adjacent lane is bordered on the left by a solid line. Moreover, the current lane 20b of the ego-vehicle 21 is bordered on the right by a solid line. These road markers are correspondingly displayed in FIG. 6C by using demarcation objects 30a, 30b, 66.

In other exemplary embodiments, it is recorded that the further road user 23 is planning a certain driving maneuver. To accomplish this, light signals from a turn signal are evaluated, or information is received via a Car2Car link. A driving maneuver object is displayed for the road user object 61 that signals that the preceding vehicle 23 is for example planning a lane change.

Figure 7A:
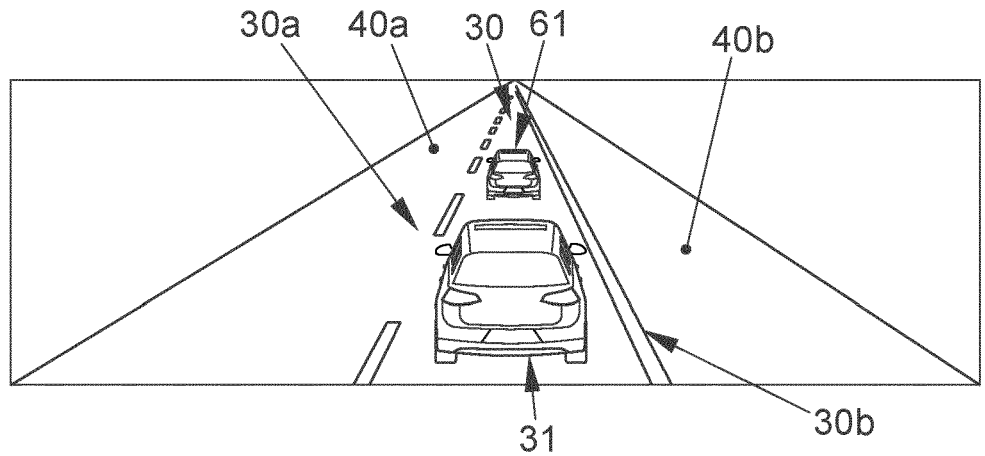
FIG. 7A to 7C show other exemplary embodiments of driver information displays generated by using the teachings herein taking into account impending oncoming traffic, if applicable.
Figure 7B:
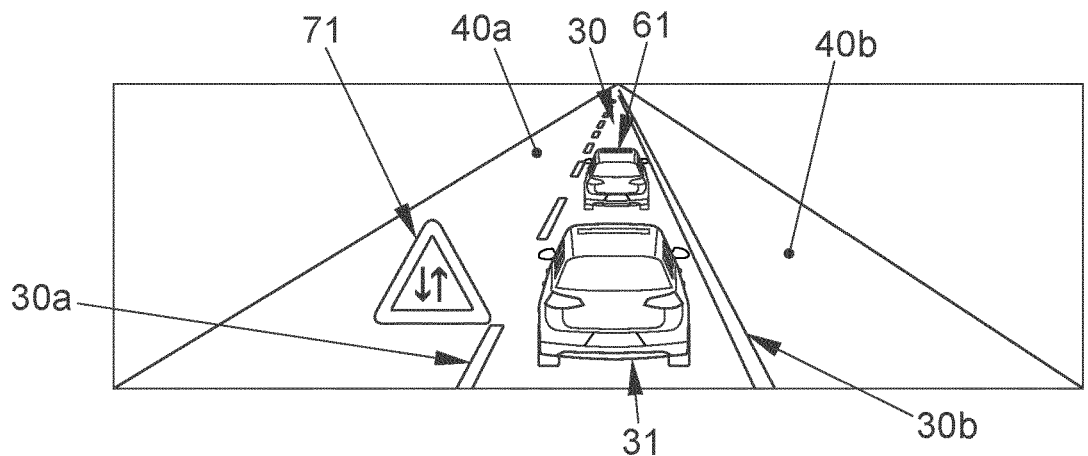
Figure 7C:
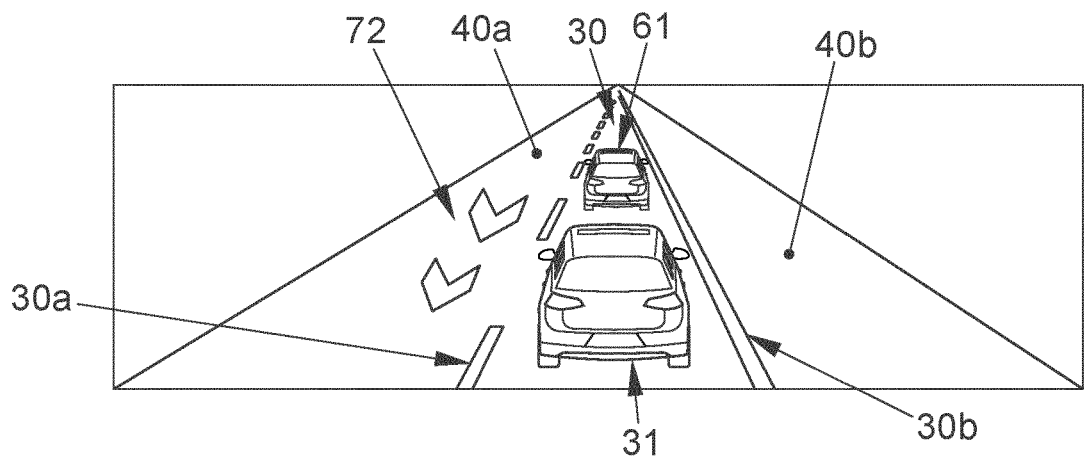

With reference to FIGS. 7A to 7C, other displays will be explained that may be generated and output with the method taking into account impending oncoming traffic, if applicable. In this case as well, the driver information system explained with reference to FIG. 1 will be assumed, and the objects will be identified if possible with the reference numbers already used above.

In the case shown in FIG. 7A, no oncoming traffic was detected on the lane of the ego-vehicle 21 as well as on the adjacent lanes. In this case, the depiction includes the lane object 30 as well as right and left bordering adjacent lane objects 40a, 40b. Furthermore, an ego object 31 as well as a preceding vehicle 23 is depicted by a road user object 61.

In the cases shown in FIGS. 7B and 7C, it was recognized that oncoming traffic may be anticipated in the lane 20a arranged on the left in the direction of travel next to the current lane of the ego-vehicle 21. The depictions differ from the depiction depicted above with reference to FIG. 7A in terms of a graphic oncoming traffic warning object 71, 72 that is arranged on the adjacent lane object 40a. The depiction is for example like a lane marker placed on a road surface.

In the exemplary embodiment, the oncoming traffic warning object 71, 72 moves with the ego object 31. In other exemplary embodiments, the oncoming traffic warning object 71, 72 in the coordinate system of the depicted road surface may be static so that the ego object 31 appears to move past to the oncoming traffic warning object 71, 72. In this case, the oncoming traffic warning object 71, 72 may repeatedly appear in multiple executions, for example in periodic intervals as long as oncoming traffic on the adjacent lane 20a is to be anticipated.

Alternatively or in addition, in other exemplary embodiments, an oncoming road user object is also depicted in the area of a lane object when it was determined that oncoming traffic is to be anticipated on the lane. The oncoming road user object may be configured so that it depicts an actual oncoming road user. It may furthermore be displayed even if no further road user was detected in order to warn the driver of the potential occurrence of oncoming traffic. The depiction of the oncoming road user object may differ if it represents an actually detected road user, or if it only is being displayed as a warning.

With respect to FIG. 8A to 8C, various depictions of the ego object in the driver information display will be explained that may be generated and output by the method. In this case as well, the driver information system explained with reference to FIG. 1 will be assumed, and the objects will be identified if possible with the reference numbers already used above.

In the exemplary embodiment, states of the lighting system 7 of the ego-vehicle 1 are recorded, and the depiction of the ego-vehicle 31 in the driver information display is generated so that it reproduces the states of various elements of the lighting apparatus 7. For example, rear lights and headlamps may be displayed illuminated or unilluminated corresponding to the recorded states.

The ego object 31 includes a depiction of the ego-vehicle 1 from a perspective from the rear in the direction of travel so that the vehicle's rear is visible. In the figures, only one section is always shown that for example shows elements of the lighting system 7 of the ego-vehicle visible from this perspective.

Figure 8A:
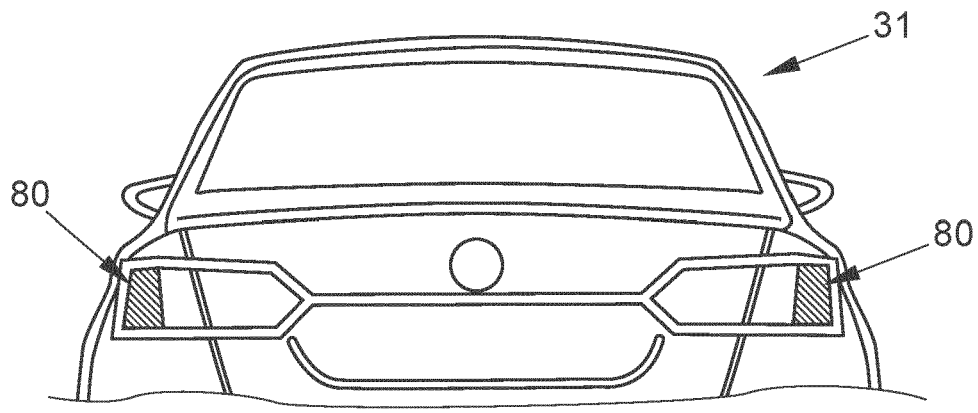
FIG. 8A to C show various depictions of the ego object in the driver information display that may be generated and output according to exemplary embodiments.

In the case shown in FIG. 8A, turn signals 80 on both sides are depicted highlighted, for example by an increased brightness and a yellow color. This is for example the case if a hazard flasher is activated. The depiction is dynamically generated in the exemplary embodiment so that a periodically recurring switching on and switching off of the turn signals 80 is output, for example just as is actually done by the lighting apparatus 7 of the ego-vehicle 1.

In other exemplary embodiments, an activation of an individual turn signal 80 is depicted, for example with a flashing light.

Figure 8B:
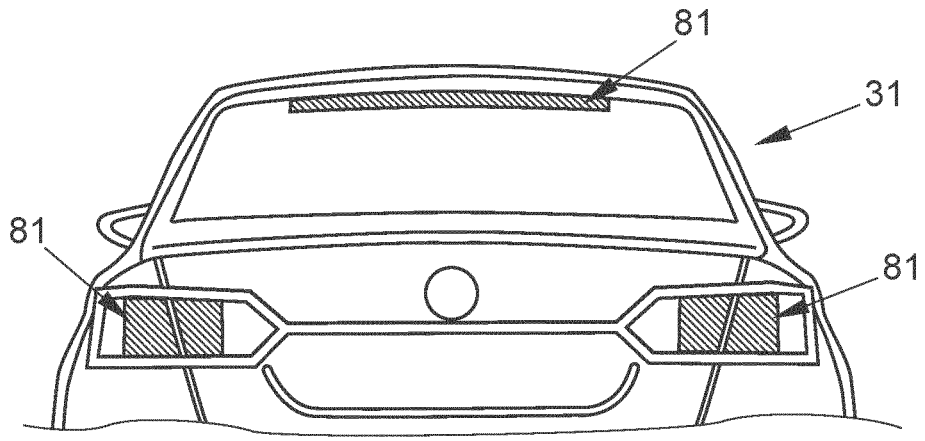
Figure 8C:
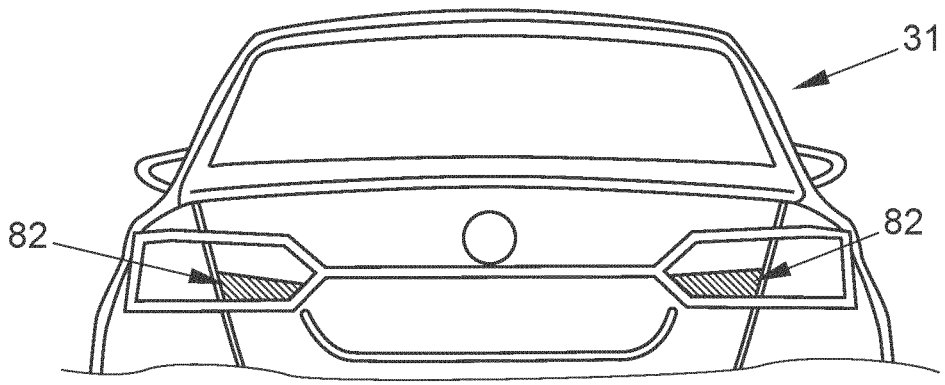

In the case shown in FIG. 8B, lights of a brake light 81 are depicted highlighted, for example by an increased brightness and a red color. Analogous to this, in the case shown in FIG. 8C, the rear lights 82 are depicted highlighted, in this case by an increased brightness and a white color.

Analogous to this, other lights may be depicted in other exemplary embodiments, for example a rear fog lamp or a marker light. Furthermore, various combination of lights may be depicted highlighted. In another exemplary embodiment, an actual illumination is furthermore recorded, wherein malfunctions are also detected, for example. The depiction may then be adapted to the actually detected illumination.

In other exemplary embodiments, an operating state of a forward-directed headlamp of the ego-vehicle is recorded such as low beams, high beams, a parking light, fog lamp, a daytime driving light or a wide beam. For example, a brightness, color, headlamp range and/or intensity distribution is recorded. The ego object is generated by using the recorded operating state analogous to the depictions explained above.

Furthermore, the depiction may include other graphic objects in an environment of the ego object 31, and these are generated for example depending on the recorded operating state of the lighting apparatus. For example, a lane object 30 is depicted with a certain texture and/or brightness distribution, wherein the light distribution on the road 20 generated by the lighting apparatus 7 is depicted for example in the area in front of the ego-vehicle 21. Further road users may also be depicted depending on if and how they are illuminated by the lighting apparatus 7. The depiction is generated such that a headlamp range and a width of light distribution is perceptible from the depiction, wherein for example the headlamp range and/or intensity depends on an angle relative to the direction of travel of the ego-vehicle 21.

In doing so, an actual illumination of physical objects may be recorded by sensors of the detection unit 2, and/or a physical model may be used in order to determine the illumination of objects by the lighting apparatus 7. For example, the influence of the lighting system on the appearance of the environment may be reproduced very realistically.

Figure 9:
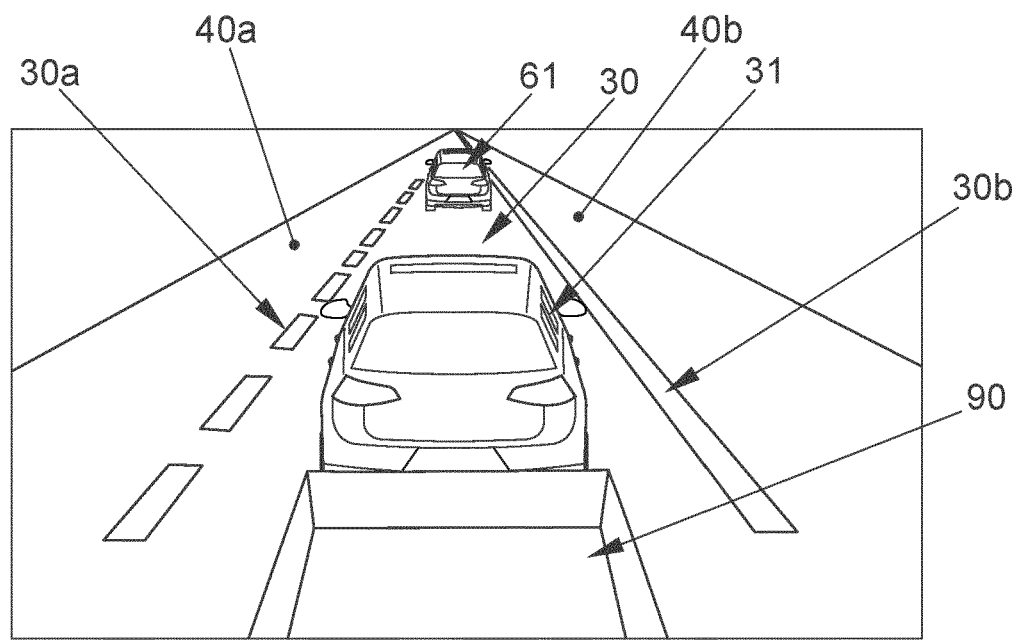
FIG. 9 shows an exemplary embodiment of a driver information display generated by using the teachings herein with a trailer object.

With reference to FIG. 9, an exemplary embodiment will be explained of a driver information display with a trailer object generated by using the method. In this case as well, the driver information system explained with reference to FIG. 1 will be assumed, and the objects will be identified if possible with the reference numbers already used above.

In the exemplary embodiment, an operating state of the trailer device 8 of the ego-vehicle 1 is recorded. If it is recorded that a device is mounted on the trailer device, then the ego object 31 is generated in combination with a graphic trailer object 90.

The display is such that the ego object 31 with the graphic trailer depiction is displayed in a perspective from the rear such that a road section of the road object 30 lying in front of the ego object 31 in the depiction is visible.

The trailer depiction may differ depending on the type of trailer object, for example in terms of its size, shape and color. For example a schematically simplified image of the real trailer object may be reproduced by the graphic trailer depiction.

In the exemplary embodiment, the driver information display furthermore includes a road user object 61 that represents a preceding vehicle 23, a lane object 30 that represents the current lane 20*b* of the ego-vehicle 1 as well as adjacent lane objects 40*a*, 44*b* for adjacent lanes 20*a*. Moreover, the lane markers are reproduced by means of demarcation marker objects 30*a*, 30*b*.

Figure 10A:
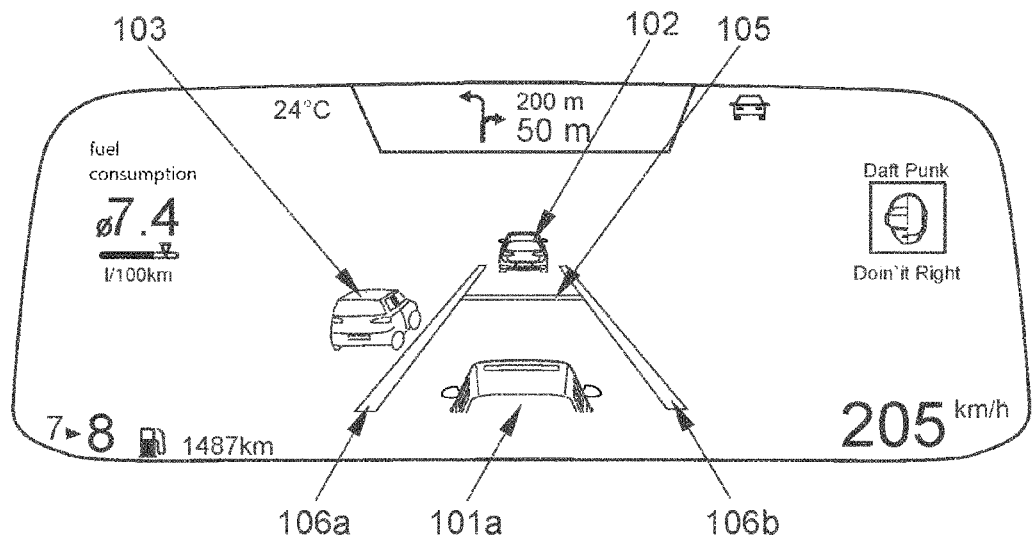
FIGS. 10A and 10B show exemplary embodiments of driver information displays for different levels of automation.
Figure 10B:
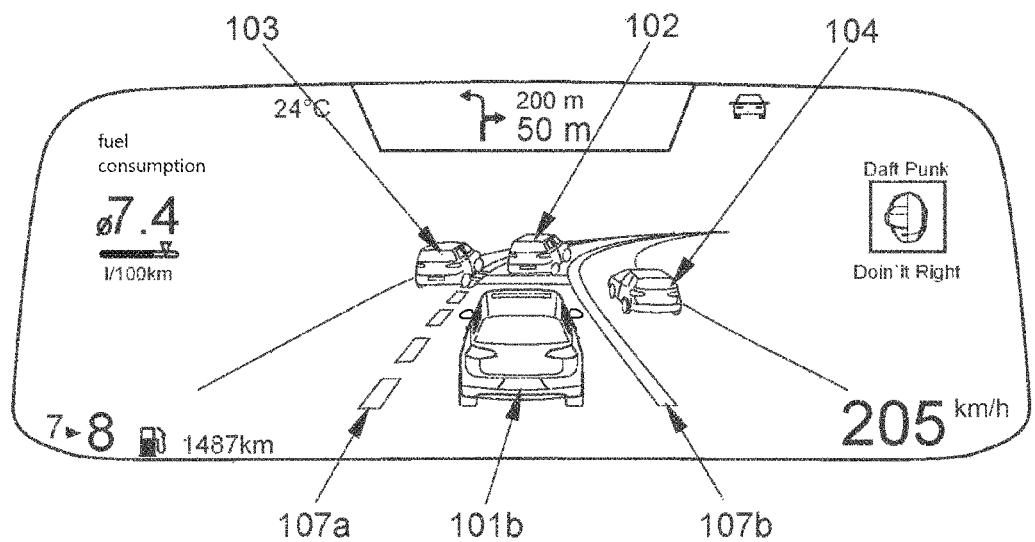

With reference to FIGS. 10A and 10B, exemplary embodiments of driver information displays for various automation levels will be explained. The above explained exemplary embodiments will be assumed.

The driver information displays include other information elements known per se in addition to environmental depictions. These include for example elements for outputting a current speed, a current gear, consumption, or played music titles. Furthermore, driving instructions of a navigation system are output.

In the case in FIG. 10A, it was detected that the driver assistance system 6 is operating on a low automation level. A reduced depiction of the environment is therefore output. In the exemplary embodiment, a longitudinal control of the ego-vehicle 1 is activated in which the driving speed is controlled so that a certain minimum distance from the preceding road users is maintained and passing on the right is avoided. In other exemplary embodiments, driver assistance modules are activated so that the transverse control of the ego-vehicle 1 is supported instead of the longitudinal control. In doing so, the reduced environmental depiction on an automation level is output in which the control is supported either in the longitudinal or transverse direction.

The driver information display in FIG. 10A includes a depiction of the environment with an ego object 101*a* for the ego-vehicle 1, a road user object 102 for a preceding vehicle, as well as a further road user object 103 for another vehicle on a left adjacent lane 20*a*. The current lane 20*b* on which the ego-vehicle 1 is located is bordered on the left and right by lane markers 106*a*, 106*b*. At a certain distance in front of the ego object 101*a*, a distance object 105 is depicted that represents a set safety distance from the preceding road users.

The ego object 101*a* is depicted in this case such that it is not fully perceptible. The depicted perspective extends from a virtual point above and to the rear of the ego-vehicle 1 so that part of the ego-vehicle 1 as well as a part of the preceding road is depicted. After the lanes is only implied and not shown in the full width.

In the driver information display, the road user object 102 for the preceding vehicle is displayed as a control object for speed and distance control. Furthermore, the further road user object 103 for the vehicle on the left adjacent lane is displayed as a control object for preventing passing on the right. Further road users are not output in this case if they do not have any direct relevance for the automatic control of driving.

The road section depicted in front of the ego object 101*a* is output with a straight course.

In the case shown in FIG. 10B, the driver information display is distinguished from the case in FIG. 10A explained above in terms of the depiction of the environment. It was detected that the driver assistance system 6 is operated with a higher automation level, wherein there is active automated intervention both in the longitudinal control as well as the transverse control of the ego-vehicle 1. An expanded depiction is therefore displayed.

The environmental depiction includes a larger area of the environment; for example, the left and right adjacent lanes are depicted in their full width. Furthermore, a further road user object 104 is depicted that represents a further road user which however does not serve as a control object for the driver information system 6. That is, the driver information display also includes such road users that are not directly used for the automated support of driving by means of the driver assistance system 6. The road markers 107*a*, 107*b* depicted in the driver information display are displayed broken, or respectively solid in this case.

The course of the road displayed in front of the ego object 101*b* depicts a curved road, wherein the curvature corresponds to an actual course of the road that is determined by means of sensors of the ego-vehicle 1 and by using map data. In the expanded depiction, the output is dynamic, i.e., a movement of the road relative to the statically depicted ego object 101*b* is depicted, wherein the curvature may also change corresponding to the actual conditions.

In one exemplary embodiment, an animated transition between the reduced view in FIG. 10A and the expanded view in FIG. 10B is depicted after user input for changing between different automation levels has been recorded. In this case, there is a switch from a lower to a higher automation level. For example, the switch between automation levels is carried out by actuating a button on the steering wheel, or a brake pedal.

In the animated transition, the perspective of the depiction is shifted so that the ego object 101*a* appears to move forward so that a larger portion of the depiction of the ego-vehicle 1 is visible. Upon reaching the expanded depiction in FIG. 10B, the ego object 101*b* is depicted fully in a rear view. At the same time as the shift in perspective, other objects in the environment are also depicted, i.e., the radius or maximum distance to other depicted objects is increased along with the number of the other objects.

With reference to FIG. 11A to 11D, exemplary embodiments of driver information displays with unclassified and classified further road users will be explained. In so doing, the above explained exemplary examples will also be assumed.

Figure 11A:
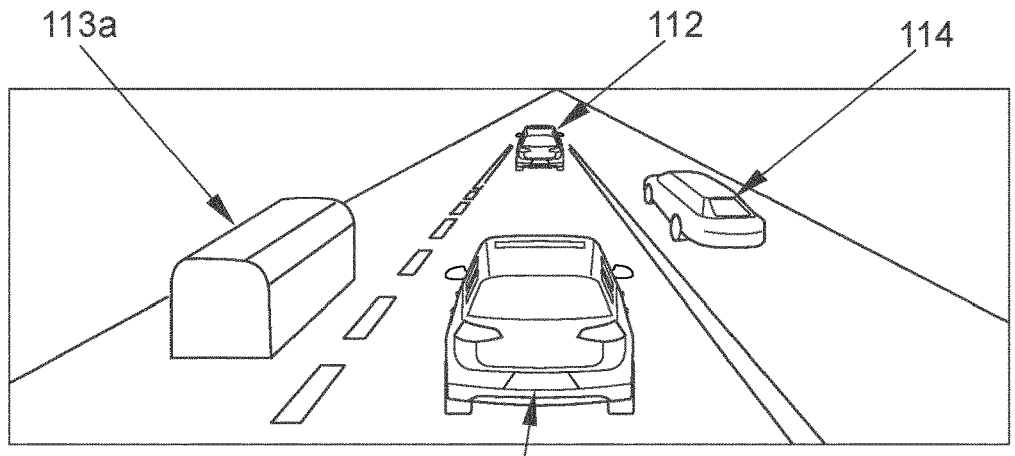
Figure 11B:
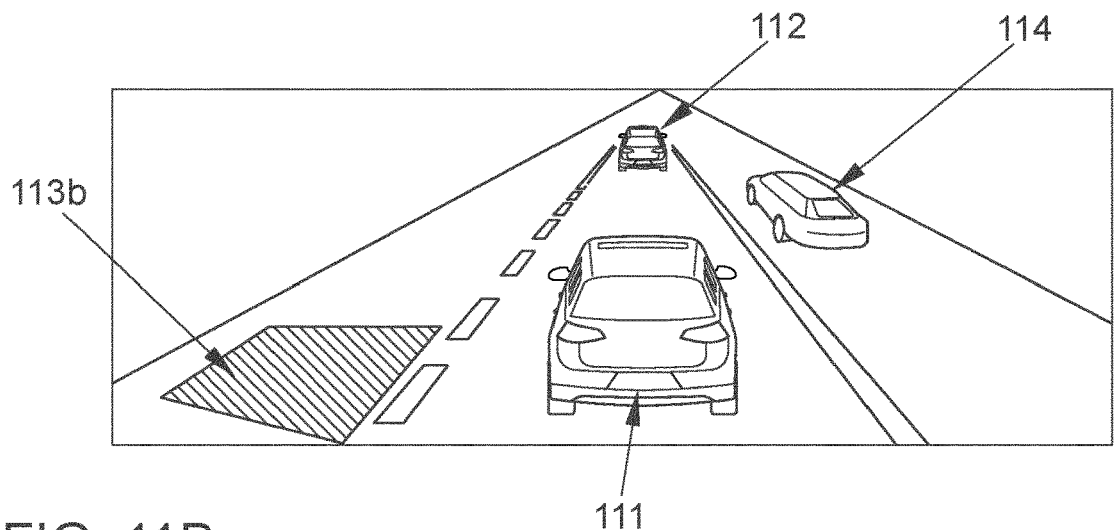

In the cases in FIG. 11A and FIG. 11B, an expanded depiction of the environment includes a rear view of an ego object 111 that represents the ego-vehicle 1, a road user object 112 for a preceding vehicle, as well as a further road user object 114 for another vehicle that is located on the right side in front of the ego-vehicle 1. The further road users were recorded and assigned to a specific road user class, wherein they were identified as passenger cars in the present case. They are depicted so that the driver may see from the driver information display that they are passenger cars in each case.

In other exemplary embodiments, other characteristics of the further road users are recorded such as their color, the vehicle type or a state of a lighting system. The road user objects 112, 114 are depicted depending on the recorded characteristics so that there is a more detailed depiction closer to reality of the road users.

The depiction furthermore includes a generic road user object 113a, 113b that represents a further road user to the left next to the ego-vehicle 1. This further road user was not precisely identified and could only be assigned to a generic road user class. The exemplary embodiment is a passing road user, wherein only its position relative to the ego-vehicle 1 was recorded by means of radar sensors in the rear and side area of the ego-vehicle 1; however, no data from a camera of the ego-vehicle 1 could be recorded that would permit a more precise categorization and assignment to a specific road user class.

In the case shown in FIG. 11A, the generic road user object 113a is depicted as a block with rounded edges, or as a similar three-dimensional shape. In the case shown in FIG. 11B, the generic road user object 113b is depicted as a hatched area. The generic road user object 113a, 113b is depicted in each case such that the position of the assigned road user relative to the ego-vehicle 1 is perceptible.

In another exemplary embodiment, the generic road user object 113a, 113b has a linear extension in the direction of travel. Since typically the length of a further road user who is approaching the ego-vehicle 1 from the rear is not recorded by sensors of the ego-vehicle 1, the generic road user object 113a, 113b is depicted with a growing linear extension while it is passing the ego-vehicle 1. That is, in the depiction, the generic road user object 113a, 113b grows in length during the passing process until it is detected that the end of the further road user has been reached.

When the passing road user to which the generic road user object 113a, 113b in FIGS. 11A and 11B is assigned has passed the ego-vehicle 1 enough for it to enter into the detection area of a camera recording the front area in front of the ego-vehicle 1, it is assigned to a specific road user class. That is, it is for example recognized that it is a passenger car of a certain type in a certain color.

Figure 11C:
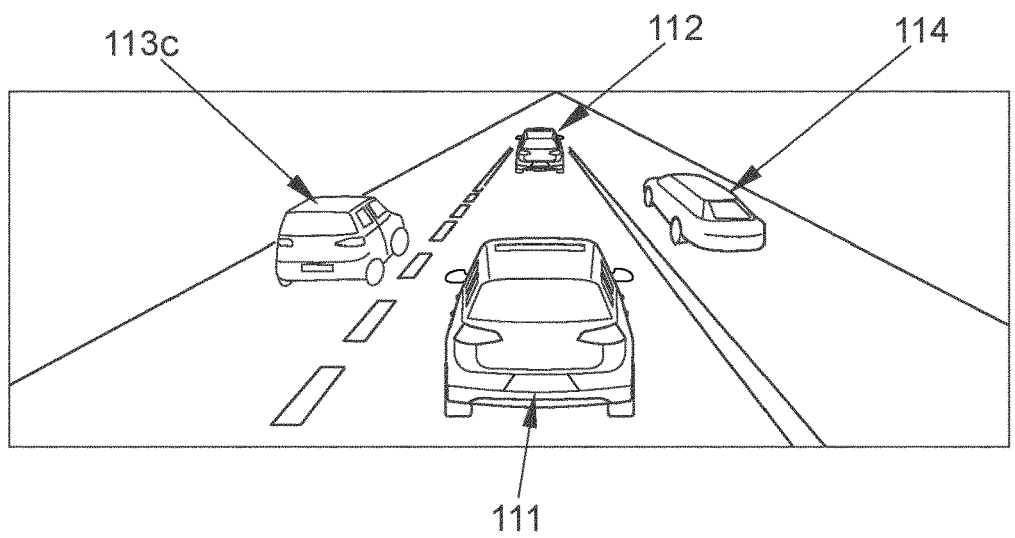

In the case shown in FIG. 11C, such a classification was made for a further road user on the left adjacent lane, and a specific road user object 113c is depicted at its position that has characteristics of the actual appearance of the further road user. A view of the further road user is depicted corresponding to the assigned road user class.

In a transition from one of the depictions in FIG. 11A or 11B to the depiction in FIG. 11C, a change from a generic road user object 113a, 113b to the specific road user object 113c is graphically depicted in a manner known per se, for example by cross-fading, morphing, the piecewise or complete replacement of the depicted elements, or by the specific road user object 113c "growing" from a generic road user object 113a, 113b.

The method in which the above-explained displays are generated will be explained in greater detail with reference to FIG. 11D by using a specific traffic situation.

An ego-vehicle 116 is moving along a lane in a direction of travel 115 that is indicated by an arrow 115. Furthermore, a further road user 117 is also moving in the direction of travel 115 on an adjacent lane and is approaching the ego-vehicle 116 from the rear.

The ego-vehicle 115 includes sensors that each have a detection area 118, 119, i.e., a rear detection area 118 that extends into the area behind the rear of the ego-vehicle 115, and a front detection area 119 that extends into the area before the front of the ego-vehicle 115.

In the driving situation shown in FIG. 11D, the further road user 117 is in the process of passing the ego-vehicle 116, i.e., it is moving at a greater speed and is in the process of driving out of the rear detection area 118 and into the front detection area 119.

In the exemplary embodiment, data are recorded by a radar sensor in the rear detection area 118. These data make it possible to detect the further road user 117, and to record its position and its distance relative to the ego-vehicle 116, as well as record its relative speed. Furthermore in the exemplary embodiment, image data are recorded by a camera in the front detection area 119. These data also make it possible to detect the further road user 117, and to record its position and its distance relative to the ego-vehicle 116; furthermore, its relative speed may be determined.

By using the image data recorded in the front detection area 119, the vehicle type may moreover be determined. For example after the further road user 117 has been recorded in the front detection area 119, the color of the vehicle, the vehicle class and manufacturer and model are determined.

In the exemplary embodiment when the further road user 117 is being recorded in the rear detection area 118, a generic road user class is determined. In the example, this includes all vehicles. After the entrance of the further road user 117 into the front detection area 119, a specific road user class is determined that for example includes all passenger cars or all compact vehicles of a particular brand.

In the exemplary embodiment, a depiction shown in FIGS. 11A and 11B is generated as long as the further road user 117 was only detected by the radar sensor with the rear detection area 118.

If the further road user 117 enters the front detection area 119 of the camera, an animated transition to the depiction in FIG. 11C is output. A morphing method known per se is used for this in order to depict an animated change from the generic road user object 113a, 113b to the specific road user object 113c.

With reference to FIGS. 12A and 12B, exemplary embodiments of driver information displays while the ego-vehicle is following will be explained. In so doing, the above explained exemplary examples will also be assumed.

The depicted displays are generated when a preceding further road user 23 is detected on a road section lying in front of the ego-vehicle 1 in the direction of travel. In the displays, the traveled lane is depicted as a lane object 30. The displays furthermore include an ego object 121 that represents the ego-vehicle 1, as well as a road user object 120 that represents the preceding vehicle 23. The depicted distance between the ego object 121 and the road user object 120 is generated according to a detected actual distance between the ego-vehicle 1 and the preceding vehicle 23, i.e., the quantitative value of the distance is discernible from the displays. The arrangement of the geographic objects 120, 121 to each other and relative to the graphic depiction of the lane corresponds to the physical situation.

The driver assistance system 6 is activated by a driver assistance module that partially intervenes automatically in the transverse control of the ego-vehicle 1. For example, an intervention in the steering occurs by applying torque to the steering in order to keep the ego-vehicle 1 on the lane.

In the exemplary embodiment, no road markers were detected on the edges of the currently driven lane. Since orientation using the road markers is impossible, driving while following is performed in which a target trajectory of the ego-vehicle 1 is controlled for example with respect to the transverse position of the ego-vehicle 1 on the traveled lane. The transverse position relates to the position in a direction transverse to the direction of travel. That is, the target trajectory of the ego-vehicle 1 is generated so that it follows a detected trajectory of the preceding vehicle 23.

The target trajectory of the ego-vehicle 1 is output by means of a trajectory object 122a, 122b that extends from the ego object 121 to the road user object 120 in the exemplary embodiment. In the case shown in FIG. 12A, the trajectory object 122a is depicted as a wide line with highlighted edges. In the case shown in FIG. 12B, the trajectory object 122b is contrastingly depicted as a narrow line. Other forms of depiction are also conceivable.

In other exemplary embodiments, an intention is recognized to perform a lane change with the ego-vehicle 1. For example, it is detected that the driver has actuated an indicator, or that an automated lane change is to be initiated. In this case, a driver assistance module may use environment data to check whether the lane change may be safely performed. For example, the positions of further road users are analyzed in this case, and the lane change is considered safely feasible if there is no collision hazard. The target trajectory is then generated so that it guides the ego-vehicle onto the adjacent lane. The trajectory object 122a, 122b, analogous to the cases shown in FIGS. 12A and 12B, may lead from a virtual front of the ego object 121 to the adjacent lane.

With reference to FIG. 13A to 13D, exemplary embodiments of driver information displays while setting a control distance will be explained. In doing so, the above explained exemplary examples will also be assumed.

Figure 13A:
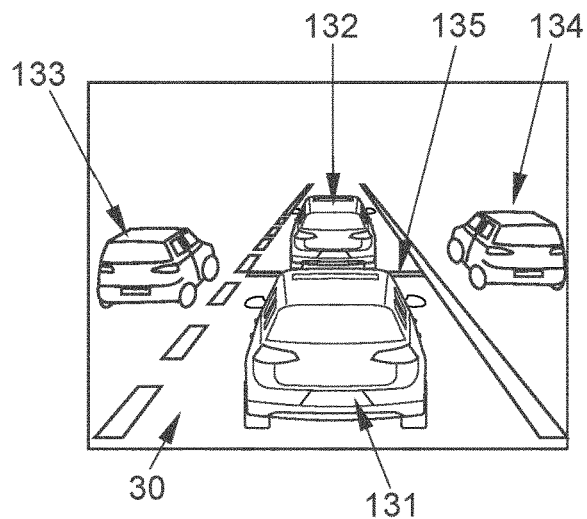
FIG. 13A to 13D show exemplary embodiments of driver information displays when setting a control distance.
Figure 13B:
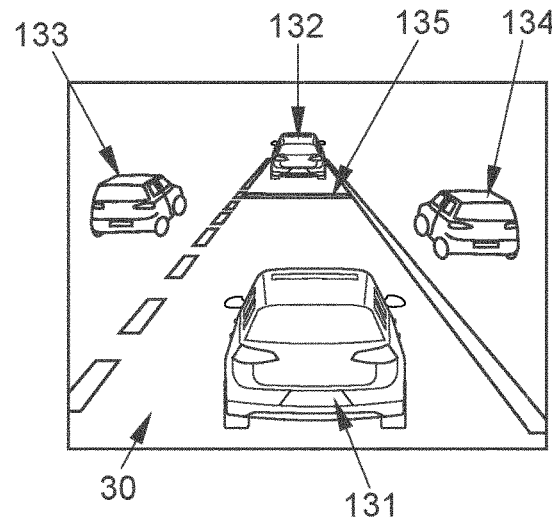

In the cases shown in FIGS. 13A and 13B, a lane object 30 is depicted that represents the lane on which the ego-vehicle 1 is moving. This lane object is bordered on the right 30b and left 30a by lane markers on the edges of the current lane of the ego-vehicle 1. The display furthermore includes an ego object 131 that represents the ego-vehicle 1. Moreover, further road users 132, 133, 134 are depicted, for example a preceding vehicle 132 as well as further road users 133, 134 on adjacent lanes.

In the direction of travel at a certain distance in front of the ego object 131, a distance object 135 formed as line transverse to the direction of travel is depicted substantially over the width of the current lane of the ego-vehicle 131. By using the distance between the ego object 131 and the distance object 135, this shows a safety distance between the ego-vehicle 1 and a proceeding further road user for which the driver assistance system 6 of the ego-vehicle 1 intervenes in the controlling of the vehicle at least partially automatically to maintain it.

The driving situations in which the depictions in FIGS. 13A and 13B are generated differ in that the ego-vehicle 1 moves at a slower speed in the case of FIG. 13A than in the case in FIG. 13B. That is, the safety distance to be maintained from a preceding further road user is greater in the case of FIG. 13B than in FIG. 13A. Correspondingly, the road user object 132 for the preceding further road user is depicted at a greater distance from the ego object 131, and the distance object 135 is also depicted at a greater distance from the ego object 131.

In the exemplary embodiment, the safety distance to be maintained by the driver assistance system 6 is set by a parameter to which a certain time interval is assigned. The length of the safety distance is determined depending on this time interval and the current speed of the ego-vehicle 1. In this case, for example the formula s=v*t is used, wherein s identifies the length of the safety distance, v identifies the current speed of the ego-vehicle 1, and t identifies the time interval specified by the parameter.

Figure 13C:
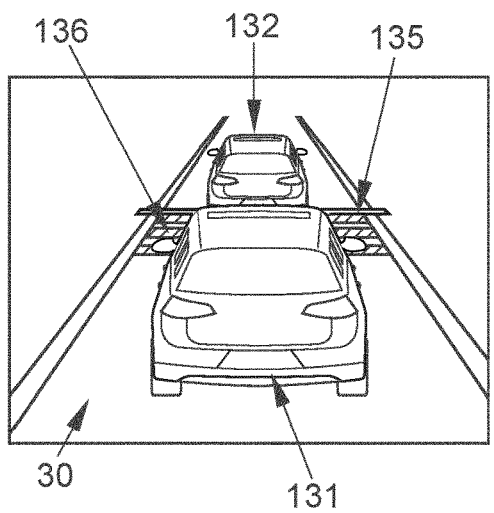
Figure 13D:
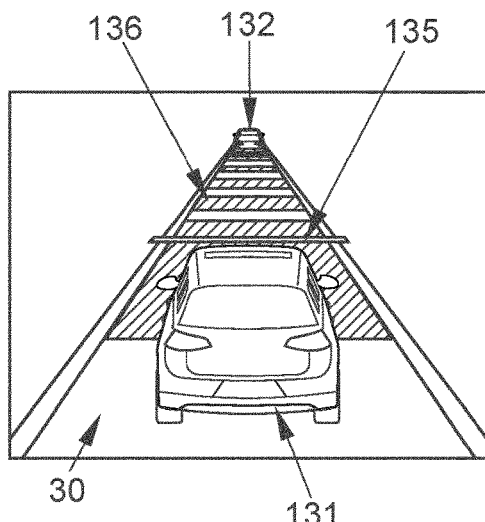

In the cases in FIGS. 13C and 13D, an actuation of an adjustment element in the ego-vehicle 1 was detected. This is for example included by the detection unit 2 or is coupled thereto. In the exemplary embodiment, it is a pushbutton switch; alternately or additionally, another entry device may also be provided such as a dial or slider. The adjusted parameter of the driver assistance system 6 is changed by this actuation.

This change causes the position of the distance object 135 to change relative to the ego object 131. Since a stepwise adjustment of the parameter is provided in the exemplary embodiment, the distance object 135 jumps one step forward or back upon the actuation, i.e., to a greater or smaller distance relative to the ego object 131 in the depiction.

The depiction in FIGS. 13C and 13D furthermore includes a distance adjustment object 136 by means of which the driver may detect the potentially adjustable values of the parameter. In the exemplary embodiment, lines that contrast in color from the distance object 135 or substantially rectangular areas are depicted on the lane object that form a distance scale object 136. The distance object 135 functions as a distance indicator object 135 that shows the actually adjusted value of the parameter using the distance scale object 136. The driver may thereby recognize whether the adjusted value of the parameter corresponds for example to the minimum or maximum adjustable value, or respectively where the adjusted value is located between these values.

The depictions in FIGS. 13C and 13D in turn differ by the speed of the ego-vehicle 1 that is greater in the case of FIG. 13D than in the case of FIG. 13C. As already explained above with reference to FIGS. 13A and 13B, the safety distance with the different values of the parameter corresponds to different lengths depending on the speed. This proportionality affects the depiction of the distance adjustment object 135 to a similar extent as the arrangement of the distance object 135. In the exemplary embodiment, the depiction of the distance adjustment object 136 at a higher speed is elongated in the direction of travel.

In other exemplary embodiments, the value of the parameter is infinitely adjustable or adjustable with a larger number of steps. The distance adjustment object 136 may be formed in another way, for example with a color scale or another scale by means of a graphic depiction feature that varies along the linear extension in the direction of travel.

The features explained in separate exemplary embodiments may be combined as desired, for example to realize the invention in a comprehensive method or system.

LIST OF REFERENCE NUMERALS

1 Ego-vehicle
2 Detection unit; sensor
3 Control unit
4 Display unit
5 Evaluation unit
6 Driver assistance system
7 Lighting apparatus
8 Trailer device
10 External unit; external server
20 Road
20a Lane
20b Lane
20c Lane marker
21 Ego-vehicle
22 Arrow
23 Preceding vehicle
24 Oncoming vehicle
25 Traffic sign
30 Lane object
30a, 30b Lane marker (depiction)
31 Ego-vehicle (depiction)
32 Curve area (depiction)
32a, 32b Road marker in curve area (depiction)
33a, 30b Traffic sign (depiction)
40a, 40b Adjacent lane (depiction)
61 Road user object, preceding vehicle (depiction)
62, 63 Road user object, vehicle on adjacent lane (depiction)
65 Signal object, arrow
71, 72 Oncoming traffic warning object
80 Turn signal
81 Brake light
82 Rear light
90 Trailer object (depiction)
101a, 101b Ego object
102 Road user object; preceding vehicle
103, 104 Road user object
105 Distance object
106a, 106b, 107a, 107b Lane marker (depiction)
111 Ego object
112 Road user object; preceding vehicle
113a, 113b Generic road user object
113C Specific road user object
114 Road user object
115 Arrow; direction of travel
116 Ego-vehicle
117 further road user
118 Rear detection area
119 Front detection area
120 Road user object; preceding vehicle
121 Ego object
122a, 122b
131 Ego object
132 Road user object; preceding vehicle
133, 134 Road user object
135 Distance object; distance indicator object
136 Distance adjustment object; distance scale object The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a driver information system in an ego-vehicle, comprising:
   recording an operating state of a trailer device of the ego-vehicle;
   generating, during forward driving of the ego-vehicle, a driver information display; and
   outputting the driver information display; wherein
      the driver information display comprises an ego-object which represents the ego-vehicle and a trailer object which represents a device, attached to the vehicle; wherein
      both, the ego-object and the trailer object are represented from behind in a perspective view and the driver information display also comprises a lane object which represents a road section lying in front of the ego-vehicle in the direction of travel; wherein
      the trailer object is formed according to the recorded operating state of the trailer device.

2. The method of claim 1, wherein
   a road path lying in front of the ego-vehicle is recorded using sensors of the ego-vehicle; and
   the lane object is formed such that it corresponds to a perspective depiction of the road path and comprises a radius of curvature such that the actual radius of curvature of a curve of the road path is output.

3. The method of claim 2, wherein a position of the ego-vehicle is determined; and the road path is recorded using map data and using the specific position.

4. The method of claim 3, further comprising
   evaluating, whether a lane change to an adjacent lane may be carried out safely; wherein
   the driver information display comprises an adjacent lane object; and wherein
      the adjacent lane object has a graphic depiction feature which is formed according to whether the lane change may be carried out safely.

5. The method of claim 3, further comprising
   recording environmental data in an environment of the ego-vehicle; and
   determining a level of automation of a driver assist system of the ego-vehicle; wherein
      the driver information display comprises a graphic depiction of the environment which is formed according to the specific level of automation.

6. The method of claim 3, further comprising
   determining a boundary marking on the road section lying in front of the ego-vehicle in the direction of travel using recorded environmental data; and
   determining a boundary marking class for the specific boundary marking; wherein
      the driver information display comprises a graphic boundary object which is formed according to the specific boundary marking class.

7. The method of claim 2, further comprising
evaluating, whether a lane change to an adjacent lane may be carried out safely; wherein
the driver information display comprises an adjacent lane object; and wherein
the adjacent lane object has a graphic depiction feature which is formed according to whether the lane change may be carried out safely.

8. The method of claim 2, further comprising
recording environmental data in an environment of the ego-vehicle; and
determining a level of automation of a driver assist system of the ego-vehicle; wherein
the driver information display comprises a graphic depiction of the environment which is formed according to the specific level of automation.

9. The method of claim 2, further comprising
determining a boundary marking on the road section lying in front of the ego-vehicle in the direction of travel using recorded environmental data; and
determining a boundary marking class for the specific boundary marking; wherein
the driver information display comprises a graphic boundary object which is formed according to the specific boundary marking class.

10. The method of claim 1, further comprising
evaluating, whether a lane change to an adjacent lane may be carried out safely; wherein
the driver information display comprises an adjacent lane object; and wherein
the adjacent lane object has a graphic depiction feature which is formed according to whether the lane change may be carried out safely.

11. The method of claim 10, further comprising
recording environmental data in an environment of the ego-vehicle; and
determining a level of automation of a driver assist system of the ego-vehicle; wherein
the driver information display comprises a graphic depiction of the environment which is formed according to the specific level of automation.

12. The method of claim 10, further comprising
determining a boundary marking on the road section lying in front of the ego-vehicle in the direction of travel using the recorded environmental data; and
determining a boundary marking class for the specific boundary marking; wherein
the driver information display comprises a graphic boundary object which is formed according to the specific boundary marking class.

13. The method of claim 1, further comprising
recording environmental data in an environment of the ego-vehicle; and
determining a level of automation of a driver assist system of the ego-vehicle; wherein
the driver information display comprises a graphic depiction of the environment which is formed according to the specific level of automation.

14. The method of claim 13, further comprising
determining a boundary marking on the road section lying in front of the ego-vehicle in the direction of travel using the recorded environmental data; and
determining a boundary marking class for the specific boundary marking; wherein
the driver information display comprises a graphic boundary object which is formed according to the specific boundary marking class.

15. The method of claim 1, further comprising
determining a boundary marking on the road section lying in front of the ego-vehicle in the direction of travel using recorded environmental data; and
determining a boundary marking class for the specific boundary marking; wherein
the driver information display comprises a graphic boundary object which is formed according to the specific boundary marking class.

16. The method of claim 1, further comprising
determining a radius of curvature of a curve lying in front of the ego-vehicle; and
recording movement data of the ego-vehicle; wherein
a criticality is determined on the basis of the recorded movement data and the detected radius of curvature; and
the graphic lane object is formed with a highlighting feature which is formed according to the determined criticality.

17. The method of claim 1, wherein the graphic lane object also has a depiction parameter which is formed according to the road surface properties or weather data.

18. The method of claim 1, wherein the generated driver information display does not include an output of a video image that is recorded by a camera of the ego-vehicle.

19. A driver information system in an ego-vehicle comprising:
a detector which is configured to record an operating state of a trailer device of the ego-vehicle; and
a control circuit which is configured to, during forward driving of the ego-vehicle, generate a driver information display and output same; wherein
the driver information display comprises a graphic ego-object which represents the ego-vehicle and a trailer object which represents a device, attached to the vehicle; wherein
the control circuit is configured to represent both, the ego-object and the trailer object from behind in a perspective view and to generate the driver information display such that it also comprises a lane object which represents a road section lying in front of the ego-vehicle in the direction of travel; wherein
the control circuit is configured to form the driver information display such that the trailer object is formed according to the recorded operating state of the trailer device.

20. The driver information system of claim 19, wherein the display unit comprises a field of view display for the output of the driver information display.

* * * * *